US009373231B2

(12) United States Patent
Moriyama et al.

(10) Patent No.: US 9,373,231 B2
(45) Date of Patent: Jun. 21, 2016

(54) PRINT DATA GENERATION APPARATUS AND NON-TRANSITORY COMPUTER-READABLE STORAGE MEDIUM

(71) Applicants: Satoru Moriyama, Iwakura (JP); Mitsuhiro Kanda, Nagoya (JP); Minako Ishida, Nagoya (JP)

(72) Inventors: Satoru Moriyama, Iwakura (JP); Mitsuhiro Kanda, Nagoya (JP); Minako Ishida, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/037,449

(22) Filed: Sep. 26, 2013

(65) Prior Publication Data

US 2014/0139867 A1 May 22, 2014

(30) Foreign Application Priority Data

Nov. 22, 2012 (JP) ................................ 2012-256168

(51) Int. Cl.
*G06F 15/00* (2006.01)
*G07G 5/00* (2006.01)
*G07G 1/14* (2006.01)

(52) U.S. Cl.
CPC ... *G07G 5/00* (2013.01); *G07G 1/14* (2013.01)

(58) Field of Classification Search
CPC .... G06F 3/1242; G06F 3/1243; G06F 3/1257
USPC ...................................................... 358/1.15
See application file for complete search history.

(56) References Cited

U.S. PATENT DOCUMENTS

| | | | | |
|---|---|---|---|---|
| 5,510,979 | A * | 4/1996 | Moderi et al. | 705/18 |
| 5,631,805 | A * | 5/1997 | Bonsall | 361/679.27 |
| 8,464,151 | B2 * | 6/2013 | Miyazawa | 715/271 |
| 2003/0004986 | A1 * | 1/2003 | Lin et al. | 707/500 |
| 2004/0128199 | A1 * | 7/2004 | Cusack et al. | 705/16 |
| 2007/0126714 | A1 | 6/2007 | Imamura | |
| 2008/0226373 | A1 * | 9/2008 | Yamaguchi et al. | 400/237 |
| 2011/0102820 | A1 * | 5/2011 | Saito | 358/1.9 |
| 2011/0181534 | A1 * | 7/2011 | Palacios | 345/173 |

FOREIGN PATENT DOCUMENTS

| | | |
|---|---|---|
| JP | 04-278991 | 10/1992 |
| JP | 06-101076 | 12/1994 |

(Continued)

OTHER PUBLICATIONS

Japanese Office Action issued in Application No. 2012-256168 on Mar. 1, 2016.

*Primary Examiner* — Tammy Pham
*Assistant Examiner* — Mark Milia
(74) *Attorney, Agent, or Firm* — McCarter & English, LLP

(57) ABSTRACT

A print data generation apparatus generating print data includes a processor, and a memory configured to store a database having a plurality of records in which texts are respectively set for fields, template data which is associated with one of operation keys and in which at least arrangement positions of the texts to be printed are set, link information associating arrangement positions in the template data with the fields of the database, and computer-readable instructions instructing the processor to execute steps including detecting operation of the operation keys, selecting, from among the plurality of records of the database, the record to be used for printing, and generating print data such that the texts that are respectively set for the fields of the selected record are arranged in the arrangement positions associated with the fields by link information, by using the template data corresponding to the operated operation key.

5 Claims, 15 Drawing Sheets

(56) References Cited

FOREIGN PATENT DOCUMENTS

| | | |
|---|---|---|
| JP | 2000-284900 | 10/2000 |
| JP | 2004-040264 | 2/2004 |
| JP | 2004-157912 | 6/2004 |
| JP | 2005-286545 | 10/2005 |
| JP | 2007-156983 | 6/2007 |
| JP | 2007-284238 | 11/2007 |
| JP | 2011-148140 | 8/2011 |
| JP | 2012-053765 | 3/2012 |

* cited by examiner

FIG. 6

95(9)

| | | FIELD 1 | FIELD 2 | FIELD 3 |
|---|---|---|---|---|
| FRUITS | RECORD 1 | Strawberry | ¥450 | Aichi |
| | RECORD 2 | Grape | ¥800 | Yamanashi |
| | RECORD 3 | Orange | ¥500 | California |
| FISH | RECORD 4 | Salmon | ¥200 | Alaska |
| | RECORD 5 | Sardine | ¥150 | Hiroshima |
| | RECORD 6 | Saury | ¥100 | Aichi |
| MEAT | RECORD 7 | Pork | ¥300 | Wakayama |
| | RECORD 8 | Beef | ¥400 | Gifu |
| | RECORD 9 | Chicken | ¥350 | Aichi |

FIG. 7

96(9)

| | FIELD 1 | FIELD 2 | FIELD 3 |
|---|---|---|---|
| RECORD 1 | Strawberry | ¥300 | Gifu |
| RECORD 2 | Grape | ¥450 | Yamanashi |
| RECORD 3 | Apple | ¥500 | Aomori |
| RECORD 4 | Orange | ¥380 | California |
| RECORD 4 | Lemon | ¥250 | Hiroshima |

FIG. 8

97(9)

| | FIELD 1 | FIELD 2 |
|---|---|---|
| RECORD 1 | Radish | ¥100 |
| RECORD 2 | Carrot | ¥150 |
| RECORD 3 | Potato | ¥85 |

FIG. 9

80(8)

| | | |
|---|---|---|
| TEMPLATE NUMBER | | 1 |
| SHEET TYPE ID | | LABEL ID 123 |
| LINKED DATABASE 9 | EXISTENCE OR NON-EXISTENCE | NO LINK |
| | NAME | NULL |
| NUMBER OF TEXTS | | 3 |
| FIRST TEXT INFORMATION | ARRANGEMENT POSITION | (0, 0) ~ (400, 60) |
| | FONT TYPE | FONT B |
| | DEFAULT TEXT | Fresh Strawberry |
| | LINK INFORMATION | NO LINK |
| SECOND TEXT INFORMATION | ARRANGEMENT POSITION | (0, 70) ~ (140, 130) |
| | FONT TYPE | FONT C |
| | DEFAULT TEXT | ¥600 |
| | LINK INFORMATION | NO LINK |
| THIRD TEXT INFORMATION | ARRANGEMENT POSITION | (150, 70) ~ (400, 130) |
| | FONT TYPE | FONT D |
| | DEFAULT TEXT | Nagano |
| | LINK INFORMATION | NO LINK |

FIG. 10

81 (8)

| | | |
|---|---|---|
| TEMPLATE NUMBER | | 2 |
| SHEET TYPE ID | | LABEL ID 124 |
| LINKED DATABASE 9 | EXISTENCE OR NON-EXISTENCE | LINK EXISTS |
| | NAME | FRUIT DATABASE 96 |
| NUMBER OF TEXTS | | 4 |
| FIRST TEXT INFORMATION | ARRANGEMENT POSITION | (0, 0) ~ (400, 60) |
| | FONT TYPE | FONT B |
| | DEFAULT TEXT | Fresh Strawberry |
| | LINK INFORMATION | FIELD 1 |
| SECOND TEXT INFORMATION | ARRANGEMENT POSITION | (0, 70) ~ (140, 130) |
| | FONT TYPE | FONT C |
| | DEFAULT TEXT | ¥650 |
| | LINK INFORMATION | FIELD 2 |
| THIRD TEXT INFORMATION | ARRANGEMENT POSITION | (150, 70) ~ (400, 130) |
| | FONT TYPE | FONT D |
| | DEFAULT TEXT | Aichi |
| | LINK INFORMATION | FIELD 3 |
| FOURTH TEXT INFORMATION | ARRANGEMENT POSITION | (0, 140) ~ (400, 200) |
| | FONT TYPE | FONT E |
| | DEFAULT TEXT | ABCD market |
| | LINK INFORMATION | NO LINK |

FIG. 11

82(8)

| | | |
|---|---|---|
| TEMPLATE NUMBER | | 3 |
| SHEET TYPE ID | | LABEL ID 125 |
| LINKED DATABASE 9 | SECOND TEXT INFORMATION | LINK EXISTS |
| | NAME | VEGETABLE DATABASE 97 |
| NUMBER OF TEXTS | | 2 |
| FIRST TEXT INFORMATION | ARRANGEMENT POSITION | (0, 200) ~ (250, 260) |
| | FONT TYPE | FONT B |
| | DEFAULT TEXT | Tomato |
| | LINK INFORMATION | FIELD 1 |
| SECOND TEXT INFORMATION | ARRANGEMENT POSITION | (260, 200) ~ (400, 260) |
| | FONT TYPE | FONT C |
| | DEFAULT TEXT | ¥100 |
| | LINK INFORMATION | FIELD 2 |

FIG. 12

83(8)

| | | |
|---|---|---|
| TEMPLATE NUMBER | | 100 |
| SHEET TYPE ID | | LABEL ID 124 |
| LINKED DATABASE 9 | EXISTENCE OR NON-EXISTENCE | LINK EXISTS |
| | NAME | PRODUCT DATABASE 95 |
| NUMBER OF TEXTS | | 4 |
| FIRST TEXT INFORMATION | ARRANGEMENT POSITION | (0, 0) ~ (400, 60) |
| | FONT TYPE | FONT B |
| | DEFAULT TEXT | Fresh Orange |
| | LINK INFORMATION | FIELD 1 |
| SECOND TEXT INFORMATION | ARRANGEMENT POSITION | (0, 70) ~ (140, 130) |
| | FONT TYPE | FONT C |
| | DEFAULT TEXT | ¥450 |
| | LINK INFORMATION | FIELD 2 |
| THIRD TEXT INFORMATION | ARRANGEMENT POSITION | (150, 70) ~ (400, 130) |
| | FONT TYPE | FONT D |
| | DEFAULT TEXT | California |
| | LINK INFORMATION | FIELD 3 |
| FOURTH TEXT INFORMATION | ARRANGEMENT POSITION | (0, 140) ~ (400, 200) |
| | FONT TYPE | FONT E |
| | DEFAULT TEXT | ABCD market |
| | LINK INFORMATION | NO LINK |

PRINT DATA GENERATION APPARATUS AND NON-TRANSITORY COMPUTER-READABLE STORAGE MEDIUM

CROSS-REFERENCE TO RELATED APPLICATION

This application claims priority to Japanese Patent Application No. 2012-256168, filed Nov. 22, 2012, the content of which is hereby incorporated herein by reference in its entirety.

BACKGROUND

The present disclosure relates to a print data generation apparatus that generates print data to perform printing on a print medium, and to a non-transitory computer-readable storage medium.

In related art, a print data generation apparatus is known that generates print data to perform printing on a print medium. For example, a data generation apparatus provided with a key allocation portion is known. The key allocation portion allocates information that identifies at least one of selection keys of a printer (this information is hereinafter referred to as allocation information) to data (various types of data, such as external character data, template data and the like) generated by a data generation portion.

A case will be described in which the data generated by the data generation portion is template data. The template data is model form data that is generated as a predetermined format prepared in advance. The data generation apparatus transfers, to the printer, the template data to which the allocation information is allocated. The printer stores the template data in a data storage portion, and stores the allocation information in an allocation information storage portion. When the selection key of the printer is operated, a data reading portion identifies the allocation information corresponding to the operated key from the allocation information stored in the allocation information storage portion. Then, the template data associated with the allocation information is read out. The printer can perform printing by combining the template data read out by the data reading portion and data edited by the printer.

SUMMARY

The above-described known printer uses a printing method in which the template data read out by the data reading portion and the data edited by the printer are combined and printed. Here, a user desires to perform printing using various printing methods depending on intended purposes. Therefore, the user desires that a new printing method is provided and that a greater variety of printing methods are available.

The present disclosure provides a print data generation apparatus that generates print data that makes it possible to perform printing using a new printing method, and a non-transitory computer-readable storage medium.

Exemplary embodiments provide a print data generation apparatus generating print data to print texts on a print medium by a printing device, including a processor, and a memory configured to store a database having a plurality of records in which texts are respectively set for fields, template data which is associated with one of operation keys for receiving an operation from a user and in which at least arrangement positions of the texts to be printed on the print medium are set, link information associating arrangement positions in the template data with the fields of the database, and computer-readable instructions. The computer-readable instructions instruct the processor to execute steps including detecting operation of the operation keys by the user, selecting, from among the plurality of records of the database, the record to be used for printing, and generating, when it is detected that one of the operation keys has been operated by the user, print data such that the texts that are respectively set for the fields of the selected record are arranged in the arrangement positions that are associated with the fields by the link information, by using the template data corresponding to the operated operation key in accordance with the link information.

Exemplary embodiments also provide a non-transitory computer-readable medium storing computer-readable instructions that instruct a print data generation apparatus which generates print data to print texts by a printing device on a print medium, to execute steps including detecting operation of operation keys by a user, selecting, from among a plurality of records of a database, the record to be used for printing, and generating, when it is detected that one of the operation keys has been operated by the user, print data such that texts that are respectively set for fields of the selected record are arranged in arrangement positions that are associated with the fields by link information, by using template data corresponding to the operated operation key in accordance with the link information, the database having the plurality of records in which the texts are respectively set for the fields, the template data being associated with one of the operation keys for receiving an operation from the user and being configured such that at least the arrangement positions of the texts to be printed on the print medium are set, and the link information associating the arrangement positions in the template data with the fields of the database.

BRIEF DESCRIPTION OF THE DRAWINGS

Embodiments will be described below in detail with reference to the accompanying drawings in which:

FIG. 6 is a data structure diagram of a product database 95;

FIG. 7 is a data structure diagram of a fruit database 96;

FIG. 8 is a data structure diagram of a vegetable database 97;

FIG. 9 is a data structure diagram of template data 80;

FIG. 10 is a data structure diagram of template data 81;

FIG. 11 is a data structure diagram of template data 82;

FIG. 12 is a data structure diagram of template data 83;

DETAILED DESCRIPTION

Figure 1:
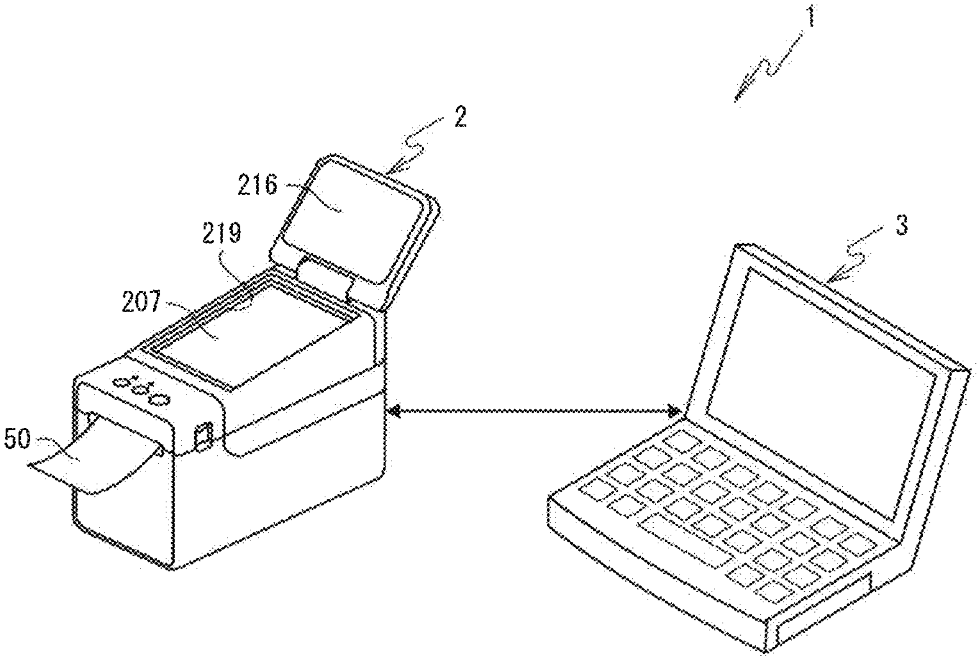
FIG. 1 is a configuration diagram of a printing system 1.

Hereinafter, an exemplary embodiment of the present disclosure will be described with reference to the drawings. First, a configuration of a printing system 1 will be described with reference to FIG. 1. Note that, in the description below, when template data 80 to 83 (refer to FIG. 2 to FIG. 4 and FIG. 9 to FIG. 12), which will be described later, are collectively referred to or are not particularly distinguished, they are referred to as "template data 8". Further, when a product database 95, a fruit database 96 and a vegetable database 97 (refer to FIG. 6 to FIG. 8), which will be described later, are collectively referred to or are not particularly distinguished, they are referred to as a "database 9" or "databases 9". Further, when sheets 61 to 63 (refer to FIG. 2 to FIG. 4), which will be described later, are collectively referred to or are not particularly distinguished, they are referred to as a "sheet 6" or "sheets 6".

In the present embodiment, it is assumed as an example that the printing system 1 is a system that is installed in a store, such as a retail store, and is used to print product price tags and the like. The printing system 1 is provided with an input device 2 and a personal computer 3 (hereinafter referred to as a PC 3). When the template data 8 (which will be described later), the database 9 (which will be described later) and the like are transferred from the PC 3 to the input device 2, the input device 2 is connected to the PC 3.

The input device 2 has functions of a printer that prints texts (characters, numbers, symbols and the like). A tape roll (not shown in the drawings), around which a tape-shaped print medium 50 is wound, is provided inside the input device 2. When the input device 2 performs printing, the print medium 50 is pulled out from the tape roll and printing is performed on the print medium 50. Then, the printed print medium 50 is cut and discharged to the outside.

The input device 2 includes a touch pad 207 on its top surface. Note that a display is not provided below the touch pad 207. A sheet 6 (refer to FIG. 2 to FIG. 4) is arranged on the upper side of the touch pad 207 such that the sheet 6 can be replaced. The sheet 6 is formed in the same shape as that of the touch pad 207 in a plan view. Further, a wall portion 219 is provided around the touch pad 207, and the wall portion 219 protrudes further upward than the touch pad 207. When the sheet 6 is arranged on the upper side of the touch pad 207, the sheet 6 is arranged on the inner side of the wall portion 219. A display 216 is provided to the rear of the touch pad 207. Various types of information are displayed on the display 216.

Figure 2:
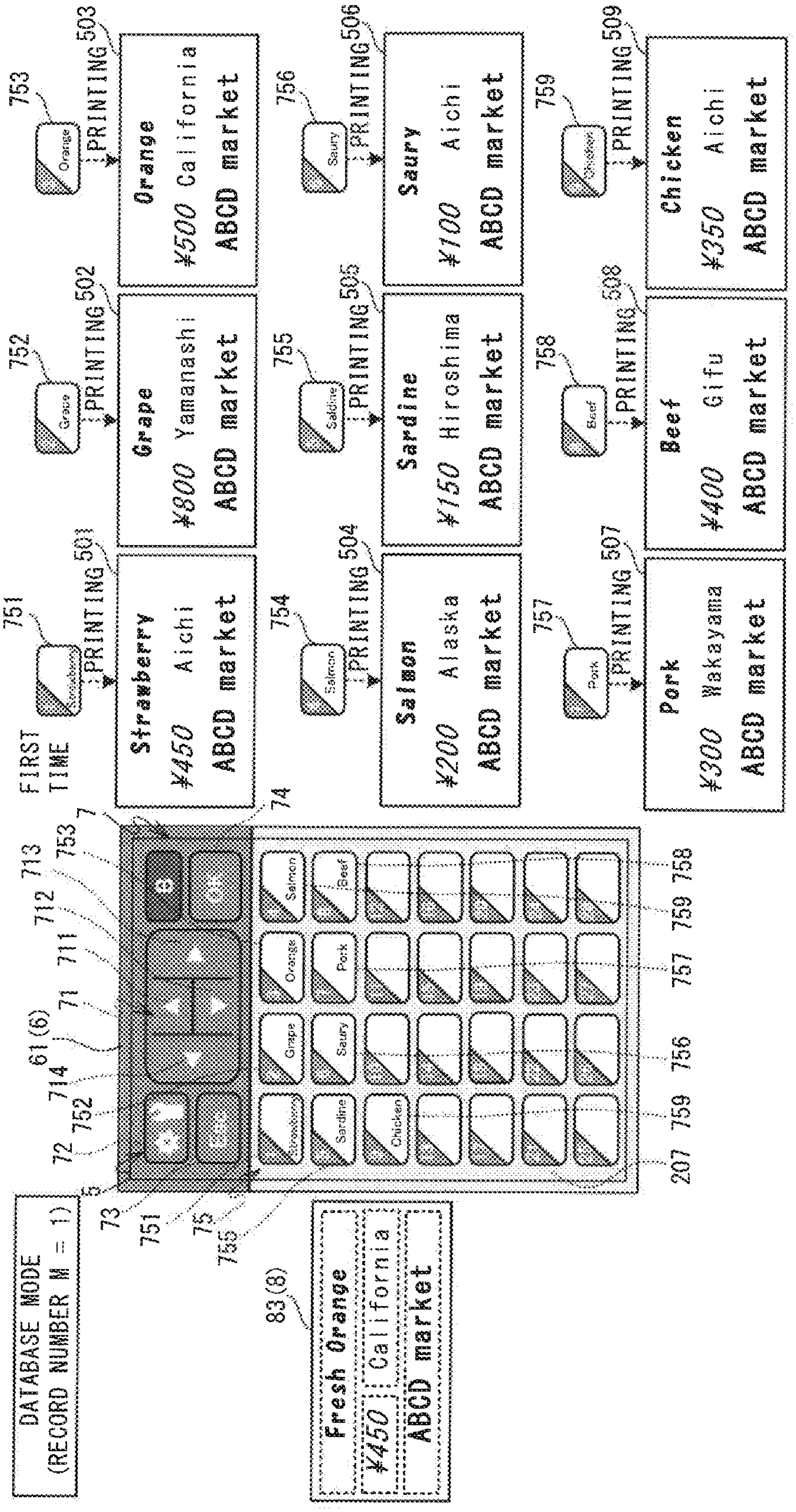
FIG. 2 is an explanatory diagram of a database mode when a DB record number M=1.
Figure 3:
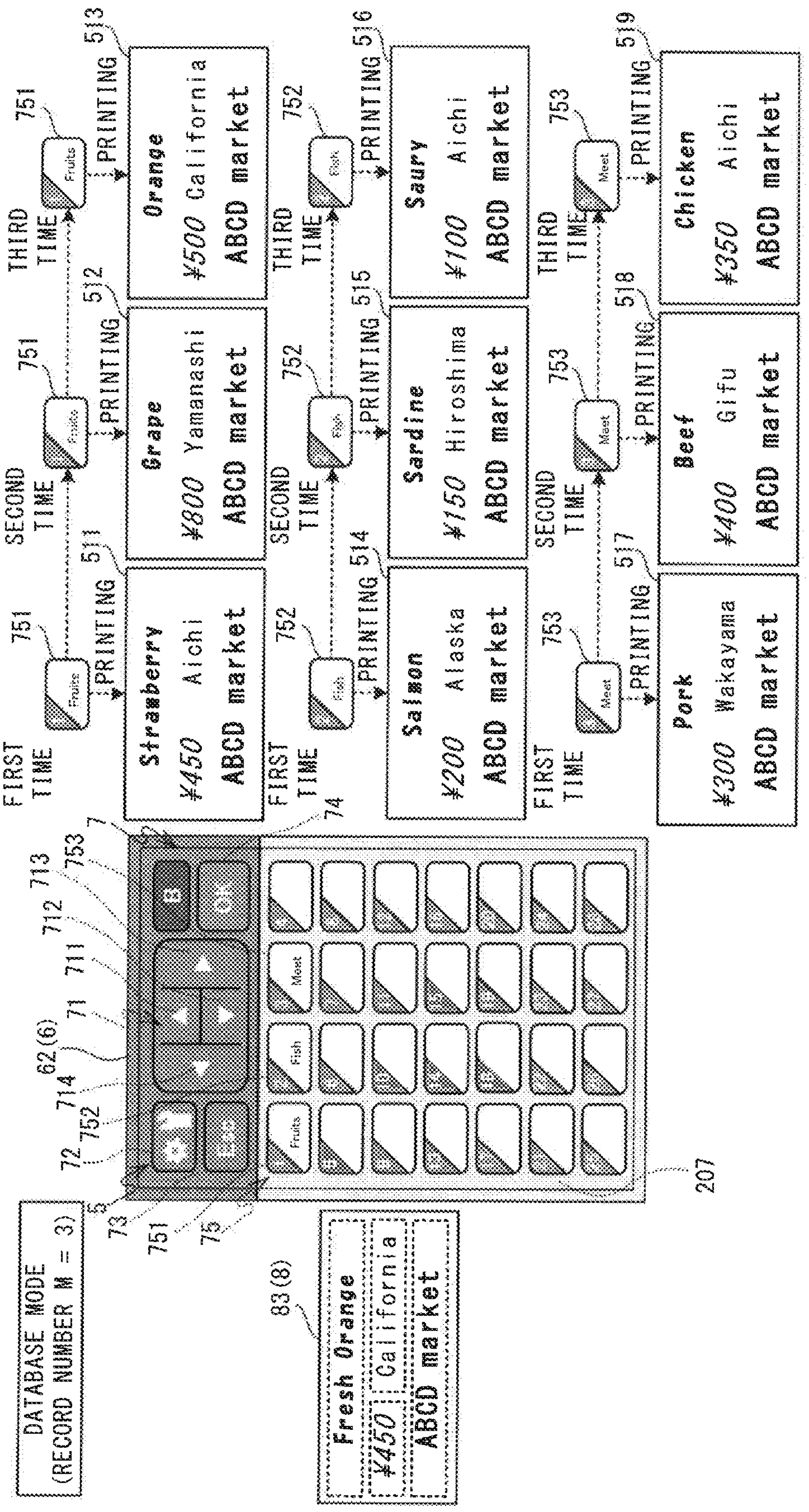
FIG. 3 is an explanatory diagram of a database mode when the DB record number M=3.
Figure 4:
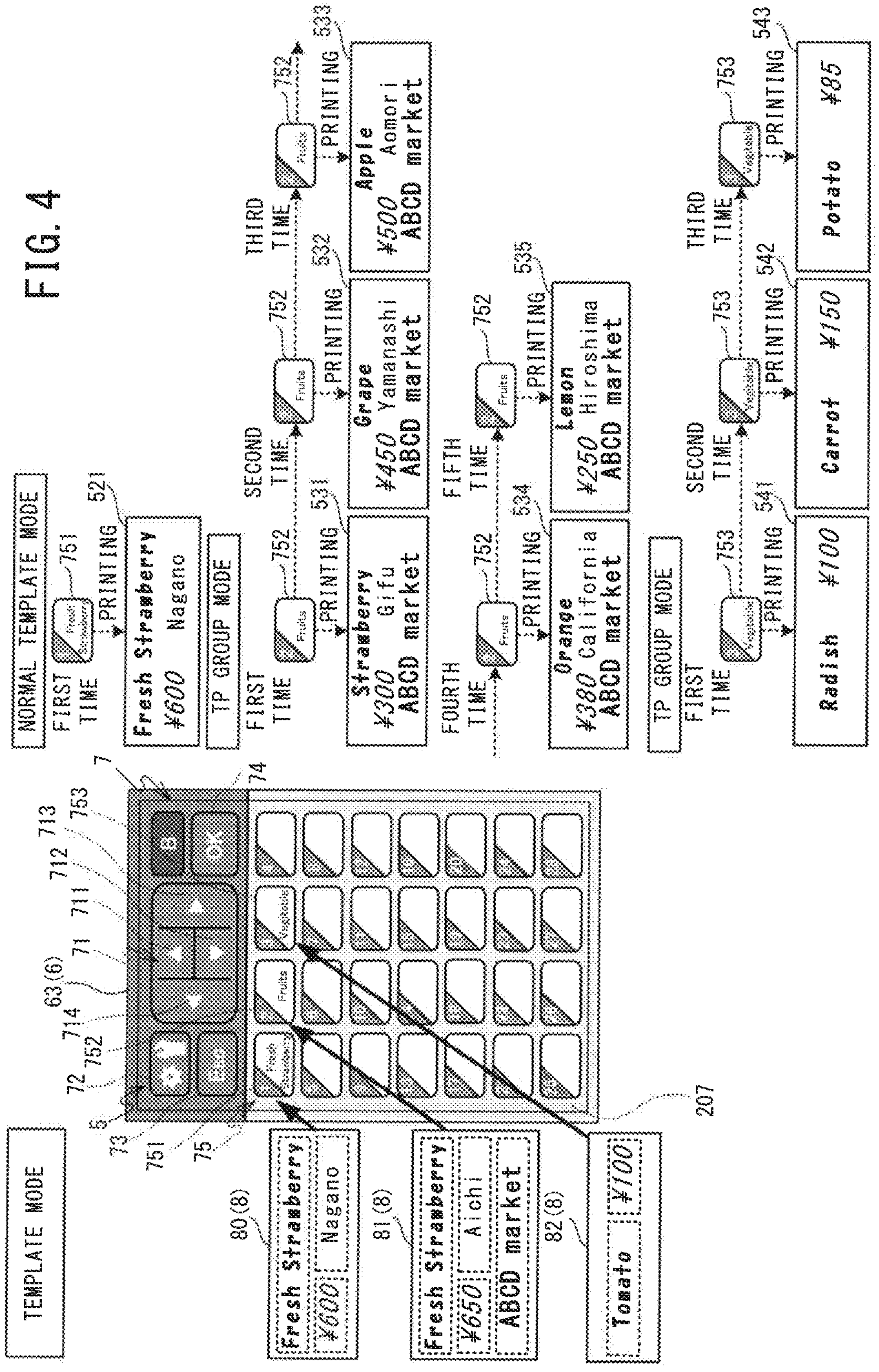
FIG. 4 is an explanatory diagram of a template mode.

Operation keys 7 of the touch pad 207 and the sheet 6 will be described with reference to FIG. 2 to FIG. 4. In the description below, the upper side, the lower side, the right side and the left side of FIG. 2 to FIG. 4 are defined as the rear side, the front side, the right side and the left side of the sheet 6. The sheets 61 to 63 shown in FIG. 2 to FIG. 4 are arranged on the upper side of the touch pad 207. Various types of keys 5 are drawn by printing on the sheet 6. A plurality of the operation keys 7 are set within a predetermined range on the touch pad 207. The keys 5 are drawn by printing on the sheet 6 corresponding to the operation keys 7 of the touch pad 207. More specifically, the keys 5 are keys on which patterns are drawn corresponding to functions of the operation keys 7 of the touch pad 207. A user can operate the operation keys 7 by depressing the keys 5 drawn on the sheet 6.

Note that various types of the sheet 6, on which are drawn the keys 5 that are different from those on the sheets 61 to 63, can be arranged on the touch pad 207. The input device 2 stores data in which positions (coordinates) of the operation keys 7 arranged on the touch pad 207 are defined for each type of the sheet 6. The user operates the input device 2 and selects the data in which the positions of the operation keys 7 are defined in accordance with the type of the sheet 6 to be arranged on the touch pad 207. A CPU 201 (refer to FIG. 5) of the input device 2 determines the positions (coordinates) of the operation keys 7 based on the selected data. When one of the keys 5 is depressed by the user, the CPU 201 detects that the operation key 7 corresponding to the depressed key 5 is operated.

As shown in FIG. 2 to FIG. 4, the operation keys 7 include cursor keys 71, an OK key 74, an ESC key 73, a function setting key 72 and number keys 75. The cursor keys 71 are provided at the center of an upper portion of the touch pad 207. The cursor keys 71 include an up key 711, a down key 712, a right key 713 and a left key 714. The function setting key 72 is provided to the left of the cursor keys 71. The function setting key 72 is a key to display, on the display 216, a selection screen having a function to set various functions. The ESC key 73 is provided to the front of the function setting key 72. The ESC key 73 is a key to return to the immediately preceding screen or to cancel the selected function. The OK key 74 is provided to the right of the cursors keys 71. The OK key 74 is a key that is operated when printing is performed or when the selected function is confirmed.

The number keys 75 are provided to the front of the cursor keys 71. Twenty-eight keys corresponding to the numbers "1" to "28" are provided as the number keys 75. The numbers "1" to "28" are drawn on the keys 5 (which correspond to the number keys 75) of the sheet 6. Among the number keys 75, the number key 75 having the number "1" is referred to as a number key 751. In a similar manner, the number keys 75 having the numbers "2" to "9" are respectively referred to as number keys 752 to 759 (refer to FIG. 2).

In the case of the sheet 61 shown in FIG. 2, "Strawberry" is printed on the key 5 that corresponds to the number key 751, and "Grape" is printed on the key 5 that corresponds to the number key 752. In a similar manner, "Orange", "Salmon", "Sardine", "Saury", "Pork", "Beef" and "Chicken" are respectively printed on the keys 5 that correspond to the number keys 753 to 759 having the numbers "3" to "9". These printed texts respectively correspond to "Strawberry", "Grape", "Orange", "Salmon", "Sardine", "Saury", "Pork", "Beef" and "Chicken" of Field 1 of a product database 95 (refer to FIG. 6).

"Fruits", "Fish" and "Meat" are respectively printed on the keys 5 that correspond to the number keys 751 to 753 of the sheet 62 shown in FIG. 3. "Fresh Strawberry" "Fruits" and "Vegetable" are respectively printed on the keys 5 that correspond to the number keys 751 to 753 of the sheet 63 shown in FIG. 4.

Figure 5:
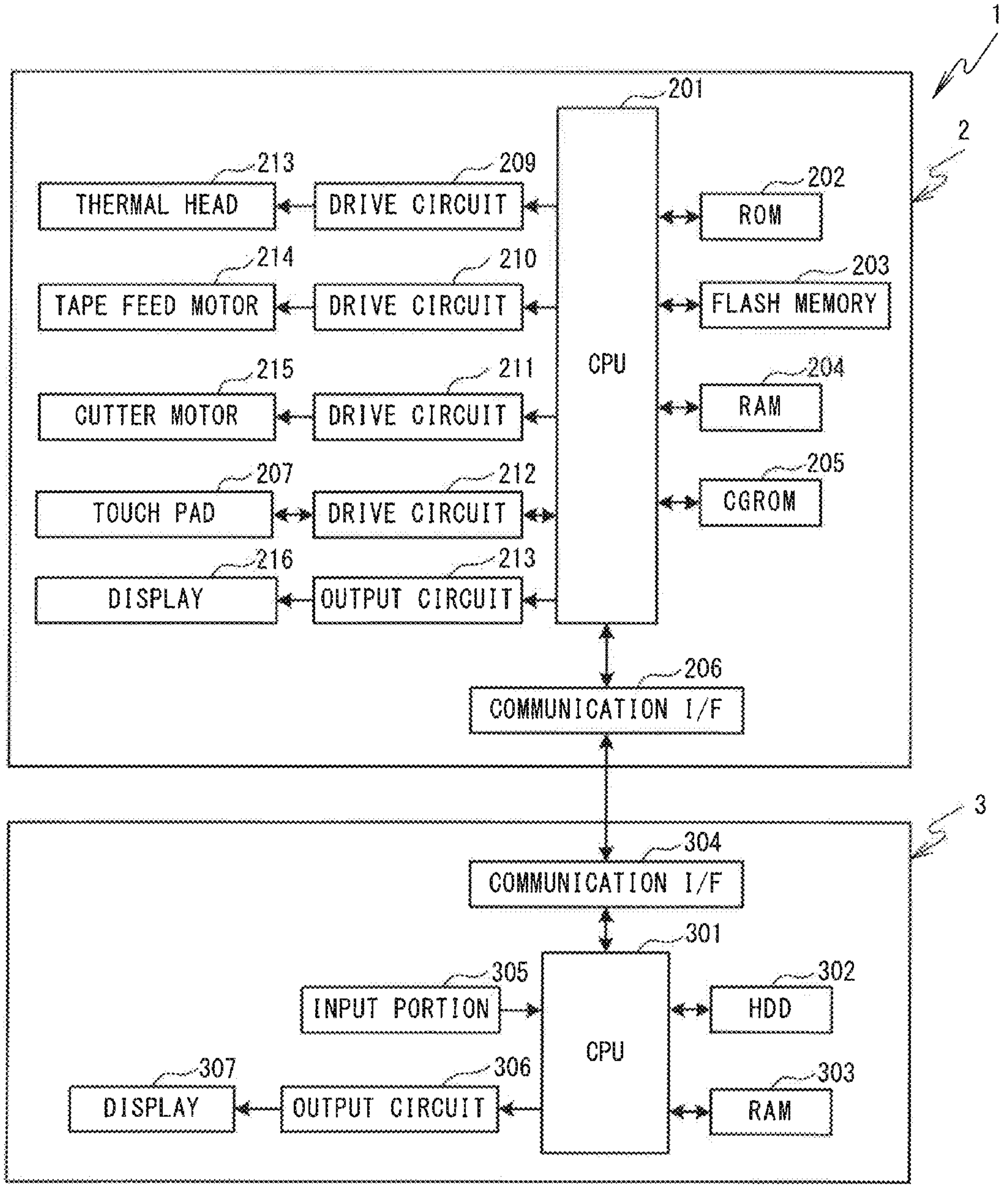
FIG. 5 is a block diagram of an electrical configuration of the printing system 1.

An electrical configuration of the printing system 1 will be described with reference to FIG. 5. As shown in FIG. 5, the PC 3 is provided with a CPU 301 that performs control of the PC 3. A hard disk drive (hereinafter referred to as an HDD) 302, a RAM 303, a communication interface (hereinafter referred to as a communication I/F) 304, an input portion 305 and an output circuit 306 are connected to the CPU 301.

Various programs executed by the CPU 301 of the PC 3 are stored in the HDD 302. Various temporary data are stored in the RAM 303. The input portion 305 is, for example, a mouse, a keyboard or the like. The output circuit 306 is connected to a display 307. The CPU 301 can display an image on the display 307 via the output circuit 306. The communication I/F 304 is an interface to perform data communication with another device (the input device 2 in the present embodiment). The communication I/F 304 is connected to a communication I/F 206 (which will be described later) of the input device 2. The CPU 301 of the PC 3 can perform communication with the CPU 201 of the input device 2 via the communication I/F 304 and the communication I/F 206 of the input device 2.

The input device 2 is provided with the CPU 201 that performs control of the input device 2. The CPU 201 is connected to a ROM 202, a flash memory 203, a RAM 204, a CGROM 205, the communication I/F 206, an output circuit 213 and drive circuits 209 to 212.

The ROM 202 stores various programs (for example, a program of main processing shown in FIG. 13) executed by the CPU 201 of the input device 2. The flash memory 203 stores various types of data (for example, the template data 80 to 83 (refer to FIG. 9 to FIG. 12) and the product databases 95, the fruit database 96 and the vegetable database 97 (refer to FIG. 6 to FIG. 8), which will be described later). The RAM 204 stores various temporary data. The CGROM 205 stores dot pattern data for printing that is used to print various texts (characters, numbers, graphics and the like) on the print medium 50.

The drive circuit 212 is an electronic circuit to drive the touch pad 207. When the user operates (depresses) one of the keys 5 that are drawn on the sheet 6 that is arranged on the touch pad 207, the CPU 201 detects a position (coordinates) operated via the touch pad 207. By doing this, the CPU 201 identifies the operated operation key 7. The drive circuit 209 is an electronic circuit to drive a thermal head 213. The CPU 201 can control the thermal head 213 via the drive circuit 209 and can perform printing on the print medium 50. The drive circuit 210 is an electronic circuit to drive a tape feed motor 214 that is used to feed the print medium 50 wound inside the input device 2 to the outside. The drive circuit 211 is an electronic circuit to drive a cutter motor 215 that causes a movable blade (not shown in the drawings), which cuts the printed print medium 50, to operate.

The database 9 will be described with reference to FIG. 6 to FIG. 8. The database 9 is provided with a plurality of records in which texts are set for each field. First, the product database 95 will be described with reference to FIG. 6. The product database 95 is a database that is used to create the print medium 50 with respect to fruits, fish and meat. In the present embodiment, the product database 95 is used in a database mode that will be described later.

As shown in FIG. 6, Records 1 to 9, in which texts are set for Fields 1 to 3, are registered in the product database 95. The Fields 1 to 3 are fields for the product name, the price and the product producing area, respectively. The fruit database 96 (refer to FIG. 7) and the vegetable database 97 (refer to FIG. 8) have a similar structure. For example, the texts “strawberry”, “¥450” and “Aichi” are registered as the Record 1 in the order of the Fields 1 to 3. These texts are used to create the print medium 50 that indicates that the product “Strawberry” is “450 yen” and is “produced in Aichi prefecture”. Note that the texts for fruits, namely, “Strawberry”, “Grape” and “Orange”, are registered in the Records 1 to 3. The texts for fish, namely, “Salmon”, “Sardine” and “Saury”, are registered in the Records 4 to 6. The texts for meat, namely, “Pork”, “Beef” and “Chicken”, are registered in the Records 7 to 9. Other pieces of information are registered as shown in FIG. 6.

The fruit database 96 will be described with reference to FIG. 7. The fruit database 96 is a database that is used to create the print medium 50 with respect to fruits. In the present embodiment, the fruit database 96 is used in a template mode that will be described later. The Records 1 to 5, in which texts are set for the Fields 1 to 3, are registered in the fruit database 96. The texts for fruits, namely, “Strawberry”, “Grape”, “Apple”, “Orange” and “Lemon”, are registered in the Field 1 of the Records 1 to 5. Other pieces of information are registered as shown in FIG. 7.

The vegetable database 97 will be described with reference to FIG. 8. The vegetable database 97 is a database that is used to create the print medium 50 with respect to vegetables. In the present embodiment, the vegetable database 97 is used in the template mode that will be described later. The Records 1 to 3, in which texts are set for the Fields 1 and 2, are registered in the vegetable database 97. The texts for vegetables, namely, “Radish”, “Carrot” and “Potato”, are registered in the Field 1 of the Records 1 to 3. Other pieces of information are registered as shown in FIG. 8.

The template data 8 will be described with reference to FIG. 2 to FIG. 4 and FIG. 9 to FIG. 12. The template data 8 is data in which at least an arrangement position of the text to be printed on the print medium 50 is set. First, the template data 80 will be described with reference to FIG. 4 and FIG. 9. The template data 80 shown in FIG. 4 has the same appearance as when the print medium 50 is printed based on the template data 80 shown in FIG. 9. As shown in FIG. 9, a template number, a sheet type ID, a linked database, the number of texts, first text information, second text information and third text information are registered in the template data 80.

The template number is a number assigned to the template, and “1” is registered as the template number. Note that the numbers of the number keys 75 are “1” to “28”. In the case of the template mode that will be described later, the printed print medium 50 is created using the template data 8 that is set to the same template number as the number of the operated number key 75. For example, when the number key 751 “1” is operated, the template data 80 in which the template number is set to “1” is used to create a printed print medium 521 (refer to FIG. 4). That is, in the template mode, the template data 8 and the number key 75 are associated by the value of the template number. The sheet type ID is information indicating the type of the sheet (the print medium 50), and “Label ID 123” is registered as the sheet type ID. The sheet type ID is set such that a difference in the type of the print medium 50, such as a difference in the width of the print medium 50, can be distinguished.

The linked database 9 includes existence or non-existence of the linked database 9 and the name of the linked database 9. In the template data 80, information indicating “No link” is registered as the existence or non-existence of the linked database 9. Further, since the existence or non-existence of the linked database 9 is “No link”, “NULL”, which indicates that no name is registered, is registered as the name of the linked database 9. The number of texts is the number of texts that are set in the template data 8. Since the first text information to the third text information are registered in the template data 80, “3” is registered as the number of texts.

Each of the first text information to the third text information includes an arrangement position, a font type, a default text and link information. In the first text information, the arrangement position “(0, 0) to (400, 60)”, the font type “Font B”, the default text “Fresh Strawberry” and the link information “No link” are registered. The arrangement position is an arrangement position of the text to be printed on the print medium 50 and is shown by coordinates on the print medium 50. In the template data 80 shown in FIG. 4, the default text “Fresh Strawberry” is arranged in the arrangement position “(0, 0) to (400, 60)” using the font type “Font B”. Note that the arrangement position “(0, 0) to (400, 60)” corresponds to the coordinates of a range shown by dotted lines around the text “Fresh Strawberry”. Further, the coordinate in the left-right direction of the template data 80 shown in FIG. 4 is an X coordinate, and the coordinate in the up-down direction of the template data 80 is a Y coordinate. Hereinafter, although not particularly explained, the coordinates of a range shown by dotted lines around each text in the template data 8 in FIG. 2 to FIG. 4 correspond to coordinates of the arrangement position of the template data 8 in FIG. 9 to FIG. 12.

The link information is information that associates the arrangement position of the text of the template data 8 with the field of the database 9. In the template data 80, since the existence or non-existence of the linked database 9 is "No link", "No link" is registered as the link information.

In the second text information, the arrangement position "(0, 70) to (140, 130)", the font type "Font C", the default text "¥600" and the link information "No link" are registered. In the template data 80 shown in FIG. 4, the default text "¥600" is arranged in the arrangement position "(0, 70) to (140, 130)" using the font type "Font C".

In the third text information, the arrangement position "(150, 70) to (400, 130)", the font type "Font D", the default text "Nagano" and the link information "No link" are registered. In the template data 80 shown in FIG. 4, the default text "Nagano" is arranged in the arrangement position "(150, 70) to (400, 130)" using the font type "Font D".

The template data 81 will be described with reference to FIG. 4 and FIG. 10. The template data 81 shown in FIG. 4 has the same appearance as when the print medium 50 is printed based on the template data 81 shown in FIG. 10. As shown in FIG. 10, the data structure of the template data 81 is similar to the data structure of the template data 80. However, in comparison to the template data 80, there is one more piece of text information and the first text information to fourth text information are registered.

In the template data 81, "2" is registered as the template number and "Label ID 124" is registered as the sheet type ID. "Link exists" is registered as the existence or non-existence of the linked database 9, and "Fruit Database 96" is registered as the name of the linked database 9. In summary, the fruit database 96 (refer to FIG. 7) is linked with the template data 81. Since the first text information to the fourth text information are registered in the template data 81, "4" is registered as the number of texts.

The first text information to the fourth text information are registered as shown in FIG. 10. "Field 1" is registered as the link information in the first text information. This indicates that setting is performed such that the default text "Fresh Strawberry" is replaced with the text registered in the Field 1 of the fruit database 96 (refer to FIG. 7) and printing is performed. Similarly, "Field 2" and "Field 3" are registered as the link information in the second text information and the third text information, respectively. Further, "No link" is registered as the link information in the fourth text information.

The template data 82 will be described with reference to FIG. 4 and FIG. 11. The template data 82 shown in FIG. 4 has the same appearance as when the print medium 50 is printed based on the template data 82 shown in FIG. 11. As shown in FIG. 11, the data structure of the template data 82 is similar to the data structure of the template data 80. Note that the first text information and the second text information are registered in the template data 82.

In the template data 82, "3" is registered as the template number and "Label ID 125" is registered as the sheet type ID. "Link exists" is registered as the existence or non-existence of the linked database 9, and "Vegetable Database 97" is registered as the name of the linked database 9. In summary, the vegetable database 97 (refer to FIG. 8) is linked with the template data 82. Since the first text information and the second text information are registered in the template data 82, "2" is registered as the number of texts. The first text information and the second text information are registered as shown in FIG. 11.

The template data 83 will be described with reference to FIG. 2, FIG. 3 and FIG. 12. The template data 83 is used in the database mode that will be described later. The template data 83 shown in FIG. 2 and FIG. 3 has the same appearance as when the print medium 50 is printed based on the template data 83 shown in FIG. 12. As shown in FIG. 12, the data structure of the template data 83 is similar to the data structure of the template data 80. Note that the first text information to the fourth text information are registered in the template data 83.

In the template data 83, "100" is registered as the template number and "Label ID 124" is registered as the sheet type ID. "Link exists" is registered as the existence or non-existence of the linked database 9, and "Product Database 95" is registered as the name of the linked database 9. In summary, the product database 95 (refer to FIG. 6) is linked with the template data 83. Since the first text information to the fourth text information are registered in the template data 83, "4" is registered as the number of texts. The first text information to the fourth text information are registered as shown in FIG. 12.

Printing modes that can be set in the present embodiment will be described. Two modes, namely, the database mode and the template mode, can be set in the input device 2. The template mode includes a normal template mode and a TP group mode.

The database mode will be described with reference to FIG. 2 and FIG. 3. Note that, in the present embodiment, it is assumed that the template data 83 (refer to FIG. 12) is used when the database mode is performed. The template data 83 (refer to FIG. 12) is linked with the product database 95 (refer to FIG. 6). Therefore, in the database mode, the texts registered in the product database 95 are used to create the printed print medium 50.

The database mode is a mode in which printing is performed such that texts in the database 9 are arranged in arrangement positions of the texts in one of the template data 8. The generation of print data when the number key 75 is operated in the database mode will be described in more detail. When the number key 75 is operated, the texts that are respectively set for the fields of the record that corresponds to the number key 75 in the product database 95 are arranged in the arrangement positions that are associated with the fields by the link information of the template data 83, and the print data is generated (step S37 in FIG. 14). The print data is data to print the texts on the print medium. Then, the generated print data is used to perform printing (step S19 in FIG. 13).

FIG. 2 and FIG. 3 are drawings that show a manner in which printing is performed in the database mode. More specifically, FIG. 2 shows a case in which the database mode is used when a DB record number M is "1". Further, FIG. 3 shows a case in which the database mode is used when the DB record number M is "3". The DB record number M is a variable that is used in the database mode, and is a variable to specify the number of records that are set as a group (hereinafter referred to as a DB group) in the database 9. For example, when the DB record number M is "3", a set of three records in the product database 95 (refer to FIG. 6) forms one DB group. In this case, in the product database 95, the Records 1 to 3 relating to fruits form one DB group. The Records 4 to 6 relating to fish form one DB group. The Records 7 to 9 relating to meat form one DB group. Further, for example, when the DB record number M is "1", one record forms one DB group in the product database 95. That is, each of the records forms one DB group.

The database mode when the DB record number M is "1" will be described with reference to FIG. 2. In the database mode when the DB record number M is "1", when one of the number keys 751 to 759 representing the numbers "1" to "9" is operated, the texts of one of the Records 1 to 9 in the product database 95 (refer to FIG. 6) are used corresponding to the number of the operated one of the number keys 751 to 759, and the print data is generated. For example, when the number key 751 is operated, the texts that are respectively set for the Fields 1 to 3 of the Record 1 that corresponds to the operated number key 751 "1" in the product database 95 (refer to FIG. 6) are arranged in the arrangement positions associated with the Fields 1 to 3 by the link information of the template data 83 (refer to FIG. 12), and the print data is generated (step S37 in FIG. 14).

Note that, at this time, "No link" is registered as the link information in the fourth text information (refer to FIG. 12). Therefore, the print data is generated in a state in which the default text "ABCD market" is arranged in the arrangement position. When printing is performed (step S19 in FIG. 13), a printed print medium 501 is created in which the texts "Strawberry", "¥450" and "Aichi" that are respectively set for the Fields 1 to 3 of the Record 1 in the product database 95 are arranged in the arrangement positions of the template data 83 (refer to FIG. 2 and FIG. 12).

In a similar manner, if the user operates one of the number keys 752 to 759 representing the numbers "2" to "9", the texts (refer to FIG. 6) registered in a corresponding one of the Records 2 to 9 are used, and a corresponding one of printed print media 502 to 509 can be created. In this manner, in the database mode when the DB record number M is "1", the texts registered in the record of the number corresponding to a number N of the number key 75 are used. That is, the Records 1 to 9 in the database 9 are associated with the number keys 751 to 759, respectively. The database mode when the DB record number M is "3" will be described with reference to FIG. 3. As described above, when the DB record number M is "3", the Records 1 to 3 relating to fruits form one DB group, and the Records 4 to 6 relating to fish form one DB group. The Records 7 to 9 relating to meat form one DB group. Then, in accordance with the number of times of operation of the number key 751 "1", the texts of the Records 1 to 3 relating to fruits, which form a first DB group, are used to generate the print data. For example, when a first operation of the number key 751 "1" is performed, the texts that are respectively set for the Fields 1 to 3 of the Record 1 in the fruit DB group are arranged in the arrangement positions that are associated with the Fields 1 to 3 by the link information of the template data 83, and the print data is generated (step S37 in FIG. 14). When printing is performed (step S19 in FIG. 13), a printed print medium 511 in which the texts "Strawberry", "¥450" and "Aichi" that are respectively set for the Fields 1 to 3 of the Record 1 in the product database 95 are arranged in the arrangement positions of the template data 83 (refer to FIG. 2 and FIG. 12).

In a similar manner, when the user performs a second operation of the number key 751 "1", a printed print medium 512 can be created using the texts of the Record 2 in the fruit DB group. When the user performs a third operation of the number key 751 "1", a printed print medium 513 can be created using the texts of the Record 3 in the fruit DB group. In this manner, the print media 511 to 513 for fruits are created in accordance with the number of times of operation of the number key 751.

When the user performs a first operation of the number key 752 "2", a printed print medium 514 can be created using the texts of the Record 4 in the fish DB group. When the user performs a second operation of the number key 752 "2", a printed print medium 515 can be created using the texts of the Record 5 in the fish DB group. When the user performs a third operation of the number key 752 "2", a printed print medium 516 can be created using the texts of the Record 6 in the fish DB group. In this manner, the print media 514 to 516 for fish are created in accordance with the number of times of operation of the number key 752.

When the user performs a first operation of the number key 753 "3", a printed print medium 517 can be created using the texts of the Record 7 in the meat DB group. When the user performs a second operation of the number key 753 "3", a printed print medium 518 can be created using the texts of the Record 8 in the meat DB group. When the user performs a third operation of the number key 753 "3", a printed print medium 519 can be created using the texts of the Record 9 in the meat DB group. In this manner, the print media 517 to 519 for meat are created in accordance with the number of times of operation of the number key 753.

In this manner, in the database 9 when the DB record number M is "3", the texts of the Records 1 to 3 are used when the number key 751 is operated. In other words, the set of three records, the Records 1 to 3, in the database 9 is associated with the number key 751. Similarly, the set of three records, the Records 4 to 6, is associated with the number key 752, and the set of three records, the Records 7 to 9, is associated with the number key 753. In this manner, when the DB record number M is "3", three records are associated with the number key 75. Therefore, it can also be said that the value of the DB record number M defines the number of records that are associated with one of the number keys 75.

The template mode will be described with reference to FIG. 4. The template mode is a mode in which printing is performed using the template data 8 that is associated with each of the number keys 75 when the different number keys 75 are operated. As described above, the template number of the template data 80 (refer to FIG. 9) is "1", and the template data 80 is associated with the number key 751 "1". In a similar manner, the template data 81 (refer to FIG. 10) is associated with the number key 752 "2", and the template data 82 (refer to FIG. 11) is associated with the number key 753 "3".

In the template mode, when the template data 8 corresponding to the operated number key 75 is the template data 8 in which the arrangement positions and the fields of the database 9 are not associated by the link information, the normal template mode is executed. Further, when the template data 8 corresponding to the operated number key 75 is the template data 8 in which the arrangement positions and the fields of the database 9 are associated by the link information, the TP group mode is executed.

The normal template mode will be described. The normal template mode is a mode in which default texts that are set in advance in the template data 8 are used to create the printed print medium 50. More specifically, in the normal template mode, unlike the database mode and the TP group mode that will be described later, the texts of the database 9 are not arranged in the arrangement positions of the template data 8. In the example shown in FIG. 4, when the number key 751 "1" is operated, the normal template mode is executed. As shown in FIG. 4, when the number key 751 "1" is operated, the default texts "Fresh Strawberry", "¥600" and "Nagano" of the template data 80 (refer to FIG. 4 and FIG. 9) that is associated with the number key 751 "1" are arranged in the arrangement positions, and the print data is generated (step S43 in FIG. 14). When printing is performed (step S19 in FIG. 13), the printed print medium 521 is created.

The TP group mode will be described. The TP group mode is a mode in which printing is performed by changing the texts in the database 9 that are arranged in the arrangement positions of the template data 8 that corresponds to the operated number key 75, in accordance with the number of times of operation of the number key 75. More specifically, in the TP group mode, in accordance with the number of times of operation of the number key 75, the record to be used for printing is selected from among the plurality of records of the database 9 (refer to step S40 and step S41 in FIG. 14). Then, the print data is generated (refer to step S42 in FIG. 14) such that the template data 8 corresponding to the operated number key 75 is used and the texts that are respectively set for the fields of the selected record are arranged in the arrangement positions that are associated with the fields by the link information. Then, the generated print data is used to perform printing (step S19 in FIG. 13).

In the example shown in FIG. 4, when the number key 752 "2" is operated, the template data 81 (refer to FIG. 10) corresponding to the number key 752 "2" is used to perform the TP group mode. Further, when the number key 753 "3" is operated, the template data 82 (refer to FIG. 11) corresponding to the number key 753 "3" is used to perform the TP group mode.

The template data 81 (refer to FIG. 10) is linked with the fruit database 96 (refer to FIG. 7). When a first operation of the number key 752 "2" is performed, the Record 1 of the fruit database 96 that is linked with the template data 81 is selected. Then, the texts "Strawberry", "¥300" and "Gifu" that are respectively set for the Fields 1 to 3 of the selected Record 1 are arranged in the arrangement positions that are associated with the fields by the link information, and the print data is generated (step S42 in FIG. 14). When the printing is performed (step S19 in FIG. 13), a printed print medium 531 is created.

In a similar manner, when the user performs a second operation to a fifth operation of the number key 752 "2", printed print media 532 to 535 can be created using the texts of the Records 2 to 5 of the fruit database 96 (refer to FIG. 7).

The template data 82 (refer to FIG. 11) is linked with the vegetable database 97 (refer to FIG. 8). When a first operation of the number key 753 "3" is performed, the Record 1 of the vegetable database 97 linked with the template data 82 is selected. Then, the texts "Radish" and "¥100" that are respectively set for the Fields 1 and 2 of the selected Record 1 are arranged in the arrangement positions that are associated with the fields by the link information, and the print data is generated (step S42 in FIG. 14). When printing is performed (step S19 in FIG. 13), a printed print medium 541 is created.

In a similar manner, when the user performs a second operation and a third operation of the number key 753 "3", printed media 542 and 543 can be created using the Records 2 and 3 of the vegetable database 97.

As shown in FIG. 4, the print media 531 to 535 for fruits are created in accordance with the number of times of operation of the number key 752. The print media 541 to 543 for vegetable are created in accordance with the number of times of operation of the number key 753. More specifically, in the TP group mode, the group of "fruits" can be printed by the user operating the number key 752, and the group of "vegetables" can be printed by the user operating the number key 753.

The main processing of the present disclosure will be described with reference to FIG. 13 to FIG. 15. When a power supply of the input device 2 is turned on and an instruction to perform the main processing is input by an operation by the user, the CPU 201 reads out the program of the main processing stored in the ROM 202 and performs the main processing. Note that the template data 8 and the database 9 described above are data generated by the user using the PC 3. It is assumed that, before the main processing is performed, the template data 8 and the database 9 are transferred from the PC 3 to the input device 2 and are stored in the flash memory 203 provided inside the input device 2.

Figure 13:
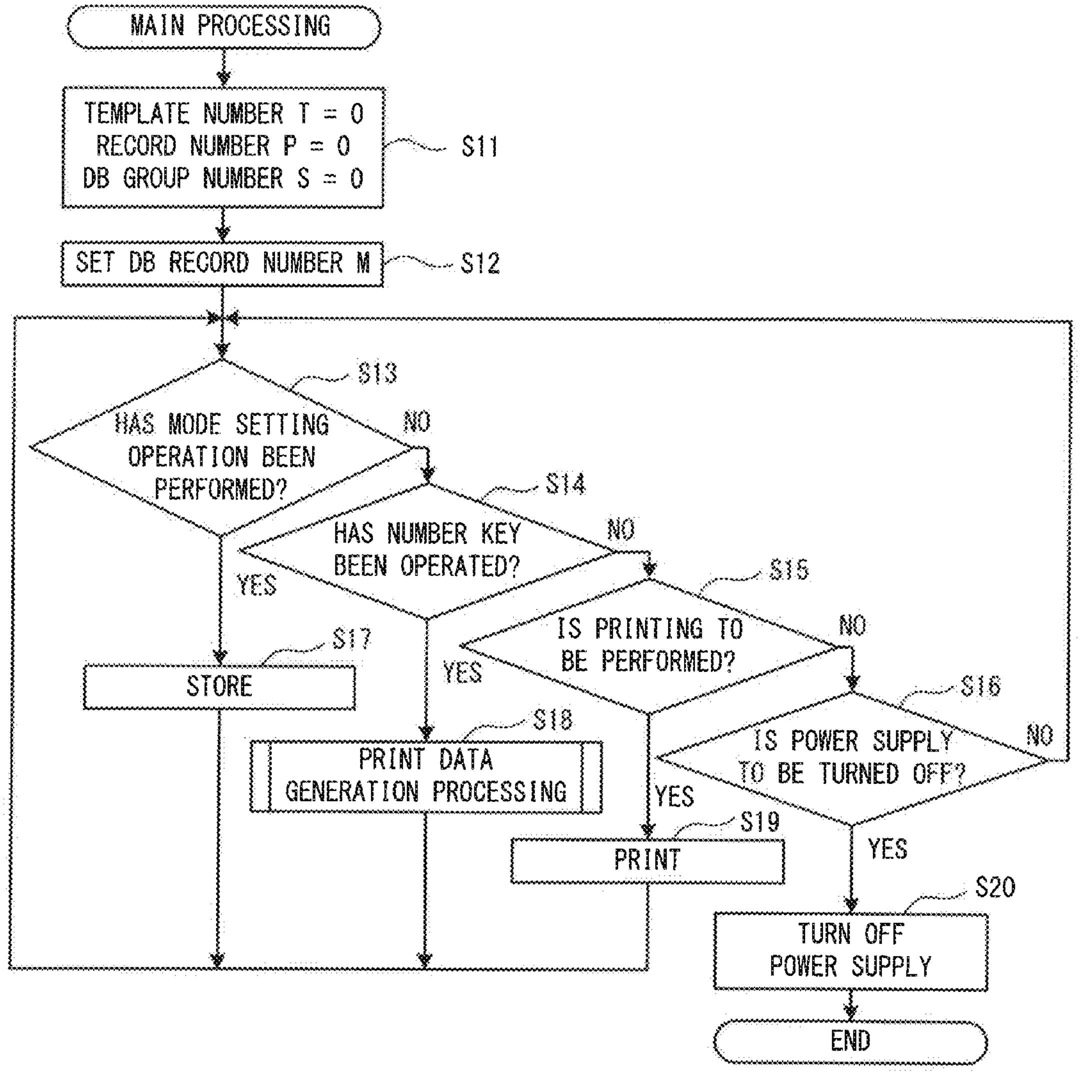
FIG. 13 is a flowchart of main processing.

As shown in FIG. 13, first, a template number T, a record number P and a DB group number S are each set to "0" and stored in the RAM 204 (step S11). The template number T is a variable to determine the template data 8 to be used for printing. The record number P is a variable to select texts to be arranged in the arrangement positions of the template data 8. The DB group number S is a variable that is set, at step S34 to be described later, to a value corresponding to the DB group in the database 9.

Next, the DB record number M is set (step S12). The DB record number M is set by the user and is stored in the flash memory 203 before the main processing is performed. The DB record number M is set at step S12 such that it is read out and stored in the RAM 204. Note that the DB record number M may be set by the user when step S12 is performed.

Next, it is determined whether or not a mode setting operation has been performed (step S13). The user sets the database mode or the template mode by operating the function setting key 72 etc. included in the operation keys 7. When the mode setting operation has not been performed (no at step S 13), it is determined whether or not the number key 75 has been operated (step S14). When the number key 75 has not been operated (no at step S14), it is determined whether or not printing is to be performed (step S15). When printing is not to be performed (no at step S15), it is determined whether or not the power supply is to be turned off (step S 16). When the power supply is not to be turned off (no at step S 16), the processing returns to step S13. When the mode setting operation has been performed (yes at step S 13), information indicating the mode set by the mode setting operation is stored in the RAM 204 (step S17).

In the description below, a case in which the setting operation for the database mode is performed and a case in which the setting operation for the template mode is performed will be separately explained using specific examples. Further, in the database mode, a case in which the DB record number M is set to "1" at step S12 and a case in which the DB record number M is set to "3" at step S12 will be separately explained.

First, the case in which the DB record number M is set to "1" at step S12 in the database mode will be explained, as a first specific example, with reference to FIG. 2 and FIG. 13 to FIG. 15. In the first specific example, the sheet 61 shown in FIG. 2 is arranged on the upper side of the touch pad 207. Further, information indicating the database mode is stored in the RAM 204 (step S 17).

When the number key 75 has been operated (yes at step S14), print data generation processing is performed (step S 18). The print data generation processing will be described with reference to FIG. 14. The print data generation processing is processing that generates print data. As shown in FIG. 14, first, mode determination processing is performed in the print data generation processing (step S31).

The mode determination processing will be described with reference to FIG. 15. The mode determination processing is processing that determines one of the database mode, the normal template mode and the TP group mode, as the mode to be used for printing. In the mode determination processing, first, the information indicating the mode stored at step S17 is referred to and it is determined whether or not the setting operation for the template mode has been performed at step S13 (step S51). When the setting operation for the database mode has been performed at step S13, it is determined that the setting operation of the template mode has not been performed (no at step S51) and it is determined that the mode to be performed is the database mode (step S52). Next, the template number T is set (step S53). The value of the set template number T is a value that is set in advance by the user in accordance with the template data 8 that is used in the database mode. The value set in advance is stored in the flash memory 203, and this value is set as the value of the template number T (step S53). In the present embodiment, it is assumed that the template number T is set to "100". That is, the template data 8 that is used in the database mode is the template data 83 (refer to FIG. 12) in which the template number is set to "100".

Figure 14:
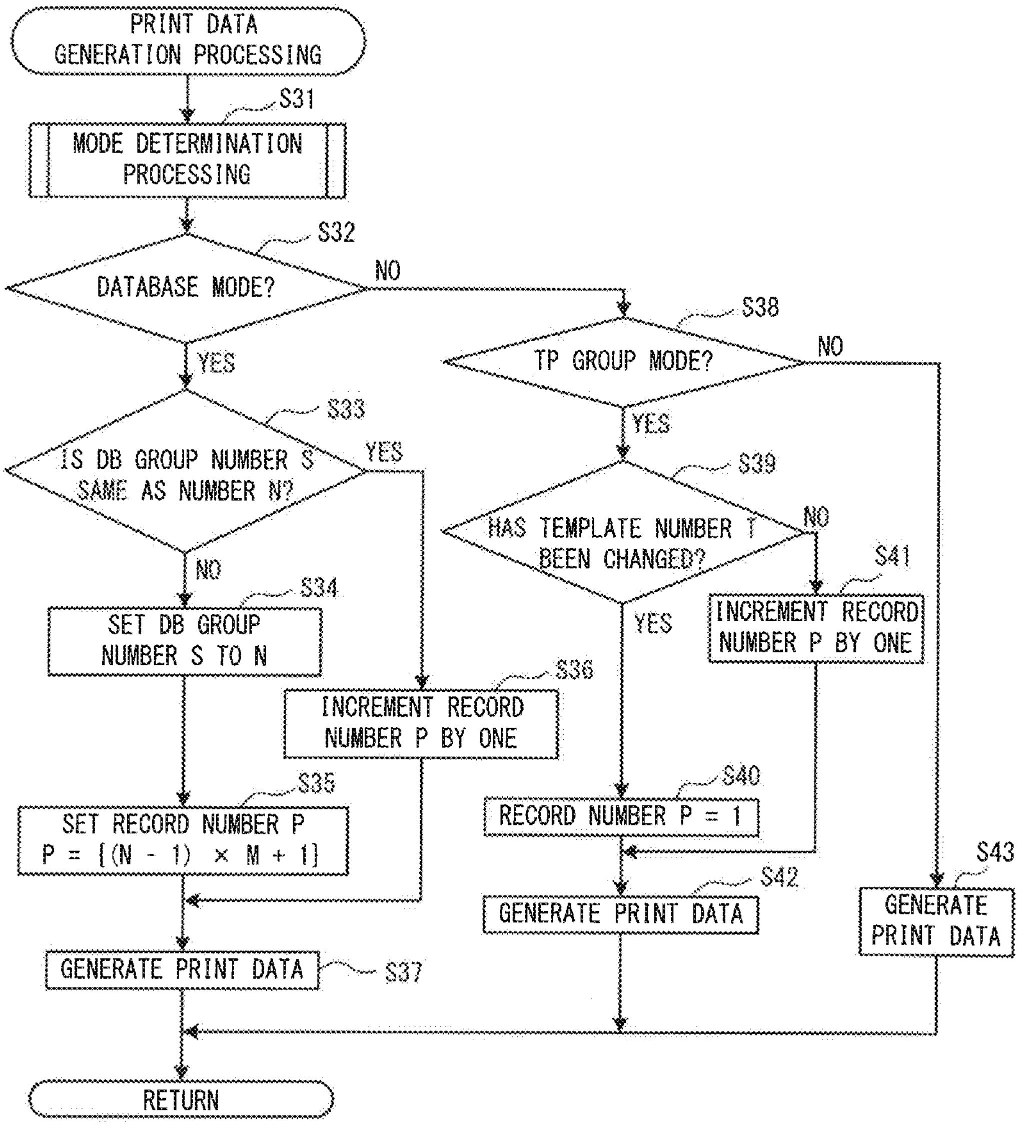
FIG. 14 is a flowchart of print data generation processing.

Next, the mode setting processing is terminated and the processing returns to the print data generation processing (refer to FIG. 14). Next, it is determined whether or not the determined mode is the database mode (step S32). When the determined mode is the database mode (yes at step S32), it is determined whether or not the DB group number S is the same as the number N of the number key 75 operated at step S14 (step S33). When the DB group number S is not the same as the number N of the operated number key 75 (no at step S33), the DB group number S is set to the number N (step S34). In the first specific example, the DB group number S is set to "1". That is, the DB group number S is set corresponding to the DB group that includes the Record 1.

Next, the record number P is set (step S35). At step S35, P={(N−1)×M+1} is calculated and the record number P is set. Note that N is the number N of the operated number key 75 and M is the DB record number M. For example, when the DB record number M set at step S12 (refer to FIG. 13) is "1" and the operated number key 75 is the number key 751 "1", the record number P is set to "1." That is, the record number P is set to a value that corresponds to the "Record 1" of the DB group number S "1". Note that, in processing at step S37 (which will be described later), the record corresponding to the record number P in the database 9 is arranged and the print data is generated. That is, the record to be used for printing is selected at step S35 from among the plurality of records of the database 9. Also in a case in which the record number P is incremented by one at step S36 (which will be described later), processing is performed in the same manner.

Next, the print data is generated (step S37). At step S37, the link information that associates the arrangement positions of the template data 8 corresponding to the template number T with the fields of the database 9 is referred to. Then, the texts in the database 9 that are respectively set for the fields of the record that corresponds to the operated number key 75 are arranged in the arrangement positions associated with the fields by the link information, and the print data is generated.

In the first specific example, the template number T is "100". Therefore, the link information of the template data 83 (refer to FIG. 12) is referred to. In the first text information to the third text information, "Field 1", "Field 2" and "Field 3" are associated with the arrangement positions of the respective texts by the link information. Further, at step S35, the record number P is set to "1" corresponding to the number N of the operated number key 75. Therefore, "Record 1" of the product database 95 is selected as the record that corresponds to the operated number key 75. Then, the texts "Strawberry", "¥450" and "Aichi" that are respectively set for the Fields 1 to 3 of the Record 1 are arranged in the arrangement positions that are associated with the Fields 1 to 3 by the link information, and the print data is generated. Note that, in the fourth text information, the link information is "No link". Therefore, the default text "ABCD market" is used for the print data to be generated. More specifically, the print data to print out the printed print medium 501 shown in FIG. 2 is generated. The generated printed data is stored in the RAM 204.

Next, the print data generation processing is terminated and the processing returns to step S13 of the main processing (refer to FIG. 13). When the user causes the input device 2 to perform printing, the user inputs an instruction to perform printing into the input device 2 by operating the OK key 74 and the like. In this case, it is determined that printing is to be performed (yes at step S15), and the printing is performed on the print medium 50 based on the print data stored in the RAM 204 (step S19). As a result, in the first specific example, the printed print medium 501 shown in FIG. 2 is created. More specifically, when the user operates the number key 751 "1", the texts of the Record 1 in the database 9 are used to create the printed print medium 501.

Next, for example, when the number key 752 "2" is operated (yes at step S14), it is determined at step S33 that the DB group number S "1" is not the same as the number "2" of the operated number key 752 (no at step S33). The DB group number S is set to "2" (step S34) and the record number P is set to "2", which is a calculation result of P={(N−1)×M+1} (step S35). At step S37, since the record number P is "2", "Record 2" of the product database 95 is selected as the record corresponding to the operated number key 75. Then, the texts "Grape" "¥800" and "Yamanashi" that are respectively set for the Fields 1 to 3 of the Record 2 are arranged in the arrangement positions that are associated with the Fields 1 to 3 by the link information, and the print data is generated (step S37). More specifically, the print data to print out the printed print medium 502 shown in FIG. 2 is generated. In this manner, when the user operates the number key 752 "2", the print data is generated using the texts of the Record 2 of the database 9.

A case will be described in which the same number key 75 is sequentially operated. For example, when the number key 752 "2" is sequentially operated (yes at step S14), it is determined at step S33 that the DB group number S "2" is the same as the number "2" of the operated number key 752 (yes at step S33), and step S36 is performed. At step S36, the record number P is incremented by one (step S36). Note that, when the record number P corresponds to the last (largest number) record in the DB group corresponding to the DB group number S, the record number P is set to a value that corresponds to the first (smallest number) record in the same DB group. For example, in the case of the first specific example, the DB group number S is "2". Further, the DB record number M in the DB group is "1". Therefore, in the database 9, one record is included in the DB group. Accordingly, even when the processing that increments the record number P by one is performed at step S36, the record number P remains "2".

Next, processing at step S37 is performed, the texts of the Record 2 that corresponds to the record number P "2" are used, and the print data to print out the printed print medium 502 shown in FIG. 2 is generated (step S37). More specifically, when the user operates the number key 752 "2", the texts of the Record 2 of the database 9 are used to generate the print data. In this manner, even when the same number key 75 is sequentially operated, the record corresponding to the sequentially operated number key 75 is used to generate the print data.

In the first specific example, when the number key 753 "3" is then operated (yes at step S19), the record number P is set to "3" (step S35), and the print data to print out the printed print medium 503 shown in FIG. 2 is generated (step S37). More specifically, when the user operates the number key 753 "3", the texts of the Record 3 of the database 9 are used, and the print data to print out the printed print medium 503 shown in FIG. 2 is generated.

Next, the case in which the DB record number M is set to "3" at step S12 in the database mode will be explained, as a second specific example, with reference to FIG. 3 and FIG. 13 to FIG. 15. As described above, when the DB record number M is "3", the Records 1 to 3 relating to fruits form one DB group, the Records 4 to 6 relating to fish form one DB group, and the Records 7 to 9 relating to meat form one DB group in the product database 95 (refer to FIG. 6). In the description below, the DB group of the Records 1 to 3 relating to fruits is referred to as the first DB group. The DB group of the Records 4 to 6 relating to fish is referred to as a second DB group. The DB group of the Records 7 to 9 relating to meat is referred to as a third DB group.

In the second specific example, it is assumed that the sheet 62 shown in FIG. 3 is arranged on the upper side of the touch pad 207. Further, it is assumed that the template number T, the record number P and the DB group number S are each set to "0" (step S11). It is assumed that information indicating the database mode is stored in the RAM 204 (step S 17).

In the second specific example, the processing flow is similar to that of the first specific example. When the number key 751 "1" is operated (yes at step S14), it is determined that the DB group number S "0" is not the same as the number "1" of the number key 751 (no at step S33). Next, the DB group number S is set to the number "1" of the number key 751 (step S34). That is, the DB group number S is set corresponding to the first DB group relating to fruits. The record number P is set to "1", which is a calculation result of P={(N−1)×M+1} (step S35). That is, the record number P is set to a value that corresponds to the first Record 1 of the first DB group that corresponds to the DB group number S "1". Then, the texts of the Record 1 that corresponds to the record number P "1" are used, and the print data to print out the printed print medium 511 shown in FIG. 3 is generated (step S37).

When the operation of the number key 751 "1" is performed for the second time (yes at step S 14), it is determined at step S33 that the DB group number S "1" is the same as the number "1" of the operated number key 751 (yes at step S33). The record number P is incremented by one and is set to "2" (step S36). More specifically, the record number P is set to a value that corresponds to the second record (i.e., the Record 2) of the first DB group that corresponds to the DB group number S "2". Then, the texts of the Record 2 that corresponds to the record number P "2" are used, and the print data to print out the printed print medium 512 shown in FIG. 3 is generated (step S37).

When the operation of the number key 751 "1" is performed for the third time (yes at step S14), it is determined at step S33 that the DB group number S "1" is the same as the number "1" of the operated number key 751 (yes at step S33). The record number P is incremented by one and is set to "3" (step S36). More specifically, the record number P is set to a value that corresponds to the third record (i.e., the Record 3) of the first DB group that corresponds to the DB group number S "3". Then, the texts of the Record 2 that corresponds to the record number P "3" are used, and the print data to print out the printed print medium 513 shown in FIG. 3 is generated (step S37). Note that, when the operation of the number key 751 "1" is performed for the fourth time (yes at step S 14), the record number P is set to "1" that is a value corresponding to the first record (i.e., the Record 1) in the first DB group (step S36). The texts of the Record 2 that corresponds to the record number P "1" are used, and the print data to print out the printed print medium 511 shown in FIG. 3 is generated (step S37). When the same number key 751 "1" is sequentially operated in this manner, the texts in the first DB group relating to fruits in the product database 95 are sequentially used to generate the print data. More specifically, when the number key 751 is operated, the record to be used for printing is selected from the first DB group that is the set of records associated with the operated number key 751 (step S35 and step S36), and the print data is generated (step S37).

Next, when the number key 752 "2" is operated (yes at step S14), it is determined that the DB group number S "1" is not the same as the number "2" of the number key 752 (no at step S33). Next, the DB group number S is set to the number "2" of the number key 752 (step S34). That is, the DB group number S is set corresponding to the second DB group relating to fish. The record number P is set to "4", which is a calculation result of P={(N−1)×M+1} (step S35). More specifically, the record number P is set to a value that corresponds to the first record (i.e., the Record 4) of the second DB group that corresponds to the DB group number S "2". Then, the texts of the Record 4 that corresponds to the record number P "4" are used, and the print data to print out the printed print medium 514 shown in FIG. 3 is generated (step S37).

When the operation of the number key 752 "2" is performed for the second time (yes at step S14), it is determined at step S33 that the DB group number S "2" is the same as the number "2" of the operated number key 752 (yes at step S33). The record number P is incremented by one and is set to "5" (step S36). More specifically, the record number P is set to a value that corresponds to the second record (i.e., the Record 5) of the second DB group that corresponds to the DB group number S "5". Then, the texts of the Record 5 that corresponds to the record number P "5" are used, and the print data to print out the printed print medium 515 shown in FIG. 3 is generated (step S37).

When the operation of the number key 752 "2" is performed for the third time (yes at step S14), the texts of the Record 6 that corresponds to the record number P "6" are used, and the print data to print out the printed print medium 516 shown in FIG. 3 is generated (step S37). When the same number key 752 "2" is sequentially operated in this manner, the texts in the second DB group relating to fish in the product database 95 are used to generate the print data. More specifically, when the number key 752 is operated, the record to be used for printing is selected from the second DB group that is the set of records associated with the operated number key 752 (step S35 and step S36), and the print data is generated (step S37).

Also when the number key 753 "3" is operated, processing is performed in the same manner. That is, in accordance with the number of times of operation of the number key 753 "3", the print data to print out the print media 517 to 519 is generated (step S37). More specifically, when the number key 753 is operated, the record to be used for printing is selected from the third DB group that is the set of records associated with the operated number key 753 (step S35 and step S36), and the print data is generated (step S37).

In the database mode, a different one of the records is used in accordance with the operated number key 75 and the print data is generated such that the texts are arranged in the arrangement positions of the template data 8 (step S37). Thus, if the user generates the single template data 83 (refer to FIG. 12), it is possible to create the plurality of types of print media 501 to 509 and 511 to 519 (refer to FIG. 2 and FIG. 3) on which different texts are printed, using the same template data 83. Therefore, in comparison to a case in which the user generates a plurality of the template data 8 in which the arrangement positions are the same but the texts are different, it is possible to reduce a workload necessary to generate the template data 8. Thus, the user can perform printing with simple settings because it is sufficient to generate a small number of the template data 8. In this manner, the input device 2 can provide a printing method that makes it possible to create the plurality of types of print media 501 to 509 and 511 to 519 with simple settings.

Further, when the number key 75 is operated (yes at step S14), the record to be used for printing is selected from the set of records associated with the operated number key 75 (step S35 and step S36), and the print data is generated (step S37). More specifically, in a state in which the records included in the single database 9 are divided into a plurality of sets and the plurality of sets are associated with the individual operation keys, it is possible to select the record and generate the print data. Therefore, in comparison to a case in which the user creates a plurality of the databases 9 and associates them with the individual number keys 75, it is possible to reduce a workload for the user to create the databases 9. Thus, the user can perform printing with simple settings because it is sufficient to create a smaller number of the databases 9. In this manner, the input device 2 can provide a printing method that makes it possible to create the plurality of types of print media 511 to 519 with simple settings.

Next, a case in which the setting operation for the template mode is performed will be described as a third specific example. In the third specific example, it is assumed that the sheet 63 shown in FIG. 4 is arranged on the upper side of the touch pad 207. When the setting operation for the template mode is performed (yes at step S13), information indicating the template mode is stored in the RAM 204 (step S17). When the number key 75 is operated (yes at step S 14), the print data generation processing is performed (step S18), and the mode determination processing is performed (step S31).

Figure 15:
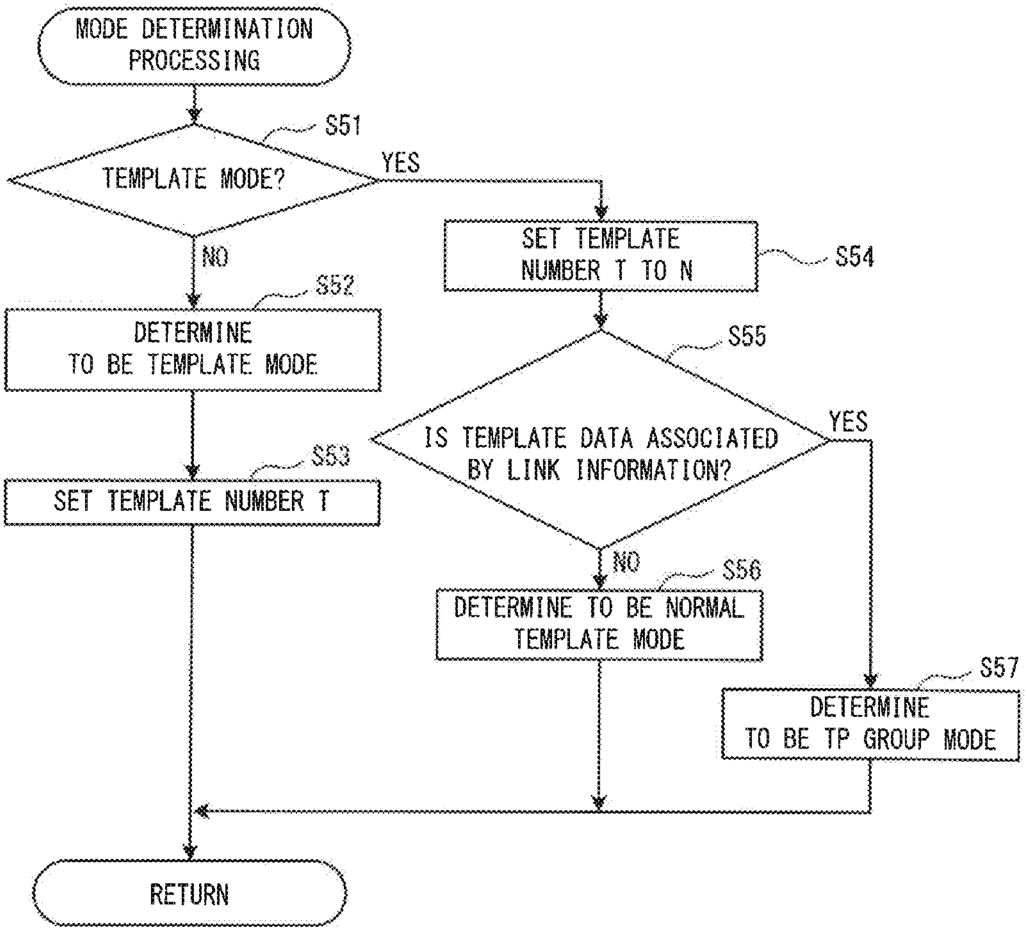
FIG. 15 is a flowchart of mode determination processing.

As shown in FIG. 15, since the information indicating the template mode is stored in the RAM 204 at step S17, it is determined that the mode is the template mode (yes at step S51). Next, the template number T is set to the number N of the number key 75 (step S54). Note that, in processing at step S42 and step S43 to be described later, the template data 8 having the template number corresponding to the template number T is used to generate the print data.

Next, it is determined whether or not the template data 8 corresponding to the template number T is the template data 8 in which the arrangement positions and the fields are associated by the link information (step S55). For example, when the number key 751 "1" is operated (yes at step S14), the template number T is set to "1" (step S54). The template data 8 in which the template number T is "1" is the template data 80 shown in FIG. 9. In the template data 80, "No link" is registered as the existence or non-existence of the linked database, and "No link" is registered as the link information in the first text information to the third text information. Therefore, it is determined that the template data 80 corresponding to the template number T "1" is not the template data 8 in which the arrangement positions and the fields are associated by the link information (no at step S55). Next, it is determined that the mode is the normal template mode (step S56). At step S56, information indicating the normal template mode is stored in the RAM 204.

Next, the mode determination processing is terminated and the processing returns to the print data generation processing (refer to FIG. 14). Next, it is determined that the determined mode is not the database mode (no at step S32), and it is determined whether or not the determined mode is the TP group mode (step S38). Since it is determined at step S56 that the mode is the normal template mode, it is determined that the determined mode is not the TP group mode (no at step S38), and the print data is generated (step S43).

At step S43, the template data 8 corresponding to the template number T is generated. Specifically, the print data to print, on the print medium 50, the texts that are set in advance in the template data 8 that corresponds to the number key 75 is generated. For example, when the template number T is "1", the default texts "Fresh Strawberry", "¥600" and "Nagano" that are set in advance in the template data 80 (refer to FIG. 9) that corresponds to the template number T "1" are arranged in the arrangement positions and the print data is generated. More specifically, the print data to print out the printed print medium 521 shown in FIG. 4 is generated. The generated print data is stored in the RAM 204. Next, the print data generation processing is terminated and the processing returns to step S13 of the main processing (refer to FIG. 13).

When the number key 752 "2" is operated (yes at step S14), the template number T is set to "2" (step S54). The template data 8 in which the template number T is "2" is the template data 81 shown in FIG. 10. In the template data 81, "Link exists" is registered as the existence or non-existence of the linked database 9, and "Field 1", "Field 2" and "Field 3" are respectively registered as the link information in the first text information to the third text information. Therefore, it is determined that the template data 81 corresponding to the template number T "2" is the template data 8 in which the arrangement positions and the fields are associated by the link information (yes at step S55). Next, it is determined that the mode is the TP group mode (step S57). At step S57, information indicating the TP group mode is stored in the RAM 204.

Next, the mode determination processing is terminated and the processing returns to the print data generation processing (refer to FIG. 14). Next, it is determined that the determined mode is not the database mode (no at step S32), and it is determined that the determined mode is the TP group mode (yes at step S38). Then, it is determined whether or not the template number T has been changed at step S54 (refer to FIG. 15) (step S39). For example, if the template number T has been changed from "1" to "2" at step S54, it is determined that the template number T has been changed (yes at step S39). Next, the record number P is set to "1" (step S40). Note that, at step S42 to be described later, the record corresponding to the record number P in the database 9 is arranged in the arrangement position and the print data is generated. That is, the record to be used for printing is selected at step S40 from among the plurality of records of the database 9. Also in a case in which the record number P is incremented by one at step S41 (which will be described later), processing is performed in the same manner.

Next, the print data is generated (step S42). At step S42, processing is performed by referring to the link information that associates the fields of the database 9 with the arrangement positions of the template data 8 that corresponds to the template number T. More specifically, the template data 8 corresponding to the template number T, namely, the template data 8 corresponding to the number key 75, is identified. Then, the linked database 9 registered in the identified template data 8 is referred to, and the record corresponding to the record number P is identified. Then, the texts that are respectively set for the fields of the identified record are arranged in the arrangement positions that are associated with the fields by the link information, and the print data is generated.

In the third specific example, the template number T is "2". Therefore, the template data 81 (refer to FIG. 10) is identified. Then, the fruit database 96 (refer to FIG. 7), which is the linked database 9 registered in the identified template data 81, is referred to, and the Record 1 corresponding to the record number P "1" is identified. Then, the texts "Strawberry, "¥300" and "Gifu" that are respectively set for the Fields 1 to 3 of the identified Record 1 are arranged in the arrangement positions that are associated with the Fields 1 to 3 by the link information, and the print data is generated. In summary, the print data to print out the printed print medium 531 shown in FIG. 4 is generated. The generated print data is stored in the RAM 204. Then, the print data generation processing is terminated and the processing returns to step S13 of the main processing (refer to FIG. 13).

When the same number key 75 is operated, for example, when the operation of the number key 752 "2" is performed for the second time (yes at step S 14), the template number T "2" is again set to "2" (step S54). Then, the TP group mode is determined (step S57). Since the template number T remains "2" and is not changed at step S54, it is determined that the template number T has not been changed (no at step S39). Next, the record number P is incremented by one (step S41). As a result, the record number P is set to "2". Then, the print data is generated (step S42). More specifically, the texts of the Record 2 corresponding to the record number P "2" in the fruit database 96 are used, and the print data to print out the printed print medium 532 shown in FIG. 4 is generated.

When the operation of the number key 752 "2" is performed for the third, fourth and fifth times, the processing is performed in the same manner. More specifically, the print data to print out the printed print media 533 to 535 is generated in accordance with the number of times of operation of the number key 752 (step S42). Note that five records (i.e., the Records 1 to 5) only are registered in the fruit database 96. Therefore, when the user performs the operation of the number key 752 "2" for the sixth time (yes at step S14), the record number is again set to "1" at step S41. In this manner, in the TP group mode, when the user operates the number key 752 "2", the records of the fruit database 96 (refer to FIG. 7) are sequentially arranged in the arrangement positions of the template data 81 corresponding to the number key 752, and the print data is generated.

When the operation of the number key 753 "3" is performed (yes at step S14), the template number T is set to "3" (step S54). Specifically, the template data 8 to be used at step S42 is changed from the template data 81 (refer to FIG. 10) to the template data 82 (refer to FIG. 11). In the template data 82 (refer to FIG. 11) corresponding to the template number T "3", "Link exists" is registered as the existence or non-existence of the linked database, and "Field 1" and "Field 2" are respectively registered as the link information in the first text information and the second text information. Therefore, it is determined that the template data 82 corresponding to the template number T "3" is the template data 8 in which the arrangement positions and the fields are associated by the link information (yes at step S55). Then, it is determined that the mode is the TP group mode (step S57).

Since the template number T has been changed from "2" to "3" at step S54, it is determined that the template number T has been changed (yes at step S39), and the record number P is set to "1" (step S40). Then, the print data is generated (step S42). More specifically, since the template number T is "3", the template data 82 (refer to FIG. 11) is identified. Then, the vegetable database 97 (refer to FIG. 8), which is the linked database 9 registered in the identified template data 8, is referred to, and the Record 1 corresponding to the record number P "1" is identified. Then, the texts "Radish" and "¥100" that are respectively set for the Fields 1 and 2 of the identified Record 1 are arranged in the arrangement positions that are associated with the Fields 1 and 2 by the link information, and the print data is generated. In summary, the print data to print out the printed print medium 541 shown in FIG. 4 is generated.

When the operation of the number key 753 "3" is performed for the second time (yes at step S 14), the record number P is set to "2" (step S41) and the print data is generated (step S42). More specifically, the texts of the Record 2 that corresponds to the record number P "2" in the vegetable database 97 are used, and the print data to print out the printed print medium 542 shown in FIG. 4 is generated.

When the operation of the number key 753 "3" is performed for the third time (yes at step S14), the record number P is set to "3" (step S41) and the print data is generated (step S42). More specifically, the texts of the Record 3 that corresponds to the record number P "3" in the vegetable database 97 are used, and the print data to print out the printed print medium 543 shown in FIG. 4 is generated.

As shown in FIG. 13, when it is determined that the power supply is to be turned off (yes at step S 16), the power supply of the input device 2 is turned off (step S20). Then, the main processing is terminated.

The processing of the present embodiment is performed as described above. The template number T in the template data 8 corresponds to the number of the number key 75. That is, the template data 8 is associated with the number key 75. In the normal template mode, when the number key 75 is operated, the template data 8 corresponding to the operated number key 75 is used and the print data is generated (step S42). Therefore, the input device 2 can provide a printing method that makes it possible to print texts on the print medium 50 using the different template data 8 when the different number keys 75 are operated.

Particularly, in the case of the TP group mode, the record number P is changed every time the number key 75 is operated. Thus, the record to be used for printing is selected from among the plurality of records of the database 9 (step S40 and step S41 in FIG. 14). Then, the texts that are respectively set for the fields of the selected record are arranged in the arrangement positions in the template data 8 that corresponds to the operated number key 75, and the print data is generated (step S42). As a result, as shown by the print media 531 to 535 or the print media 541 to 543 in FIG. 4, the same template data 8 can be used to create the print media having different texts. In this manner, in the TP group mode, it is possible to easily generate the print data having different texts using the same template data 8. In other words, the input device 2 can provide a printing method that makes it possible to print different texts using the same template data 8.

Further, the record to be used for printing is selected in accordance with the number of times that the number key 75 is operated (step S35, step S36, step S40 and step S41 in FIG. 14). Therefore, the user can easily change the texts to be printed on the print medium 50 by adjusting the number of times of operation of the number key 75.

Further, in the TP group mode, when the user operates the single number key 752, the input device 2 can print three types of texts corresponding to the Fields 1 to 3 registered in the fruit database 96 (refer to the print media 531 to 535 in FIG. 4). More specifically, by operating the single number key 752, it is possible to create the plurality of types of print media 531 to 535. In a similar manner, by operating the single number key 753, it is possible to create the plurality of types of print media 541 to 543. In this manner, the input device 2 can provide a printing method that makes it possible to create a plurality of types of the print media 50 by the user operating one of the number keys 75. Further, for example, if the template data 8 is associated with all the numbers "1" to "28" of the number keys 75 and the template data 8 is linked with the database 9, it is possible to create 28 (that is, the number of the number keys 75) or more types of the print media 50. In this manner, the input device 2 can provide a printing method that makes it possible to create more (the number of the number keys 75 or more) types of print media.

Further, in the TP group mode, when the number key 752 is operated, the texts of the "Fruit" group registered in the fruit database 96 are printed. When the number key 753 is operated, the texts of the "Vegetable" group registered in the vegetable database 97 are printed. Further, in the database mode when the DB record number M is "3", when the number key 751 is operated, the texts of the "Fruit" group of the product database 95 are printed. In a similar manner, when the number key 752 is operated, the texts of the "Fish" group are printed, and when the number key 753 is operated, the texts of the "Meat" group are printed. In this manner, printing can be performed by allocating the groups to each of the number keys 75. Thus, usability is improved when the user uses the input device 2. In this manner, the input device 2 can provide a printing method that makes it possible to perform printing by allocating the groups to each of the number keys 75.

When the template data is the template data 8 in which the arrangement positions and the fields are associated by the link information (yes at step S55), the print data can be generated using the texts in the database 9 (step S42). Further, when the template data is the template data 8 in which the arrangement positions and the fields are not associated by the link information (no at step S55), it is possible to generate the print data without using the database 9 but using the texts set in advance in the template data 8 (step S43). In this manner, depending on whether or not the template data is the template data 8 in which the arrangement positions and the fields are associated by the link information, it is possible to automatically switch between a case in which the database 9 is used and a case in which the database 9 is not used.

Further, the link information is included in the template data 8. Therefore, the CPU 201 can generate the print data by referring to the link information included in the template data 8 (step S37 and step S42).

Further, the operation keys 7 are set on the touch pad 207. Therefore, by operating the touch pad 207, the user can input an instruction to cause the input device 2 to generate the print data.

Further, the sheets 6, on which the keys 5 corresponding to the operation keys 7 are drawn, can be replaced in accordance with the functions of the operation keys 7. For example, in the database mode when the DB record number M is "1", the sheet 61 is used (refer to FIG. 2). The texts "Strawberry", "Grape" and the like are printed on the number keys 75 of the sheet 61. Therefore, the user can easily ascertain that the print media 501 to 509 corresponding to the texts printed on the number keys 75 can be created by operating each of the number keys 751 to 759. Meanwhile, in the template mode, the sheet 63 is used (refer to FIG. 4). The texts "Fresh Strawberry", "Fruits" and "Vegetable" are respectively printed on the number keys 751 to 753 of the sheet 63. Therefore, the user can easily ascertain that the print medium 521 on which the text "Fresh Strawberry" is printed can be created by operating the number key 751. Further, the user can easily ascertain that the print media 531 to 535 relating to fruits or the print media 541 to 543 relating to vegetables can be created by operating the number key 732 or the number key 753. In this manner, the sheets 6 can be replaced in accordance with the text to be printed. Therefore, the user can easily ascertain the printed print medium 50 to be created, and user-friendliness is improved.

Note that the present disclosure is not limited to the above-described embodiment and various modifications are possible. For example, the input device 2 has the structure to perform printing (the thermal head 213, the tape feed motor 214, the cutter motor 215, the drive circuits 209 to 212, and the like). However, the structure to perform printing need not necessarily be provided. In this case, for example, a printer having a structure to perform printing may be separately provided, and printing may be performed by transferring the generated print data to the printer.

Further, the configuration of the operation keys 7 is not limited. For example, the operation keys 7 may be configured by a physical keyboard. Further, although the sheet 6 is arranged on the touch pad 207, the present disclosure is not limited to this example. For example, a display may be provided below the touch pad 207, and the same pattern as the keys 5 of the sheet 6 may be displayed on the display.

Further, the template data 8 and the database 9 are generated by the PC 3 and then transmitted to the input device 2. However, the present disclosure is not limited to this example. For example, the user may operate the operation keys 7 and generate the template data 8 and the database 9 using the input device 2.

The two types of the template data 8, namely, the template data 8 in which the arrangement positions and the fields are associated by the link information and the template data 8 in which they are not associated, are used in the template mode. However, the present disclosure is not limited to this example. For example, all the template data 8 used in the template mode may be the template data 8 in which the arrangement positions and the fields are associated by the link information.

Further, although the link information is included in the template data 8, the present disclosure is not limited to this example. For example, the link information need not necessarily be included in the template data 8, and may be separate data. Further, the link information may be included in the database 9. Also in these cases, the CPU 201 can generate the print data (step S37, step S42 and step S43) by referring to the link information generated as separate data from the template data 8, or by referring to the link information included in the database 9.

Further, a set of a predetermined number of records associated with each of the number keys 75 is changed depending on the value of the DB record number M. However, the present disclosure is not limited to this example. For example, each set of records may be set in advance in the product database 9. More specifically, the database 9 may be set in advance such that the Records 1 to 3, the Records 4 to 6 and the Records 7 to 9 are respectively associated with the number keys 751, 752 and 753. Further, the function to associate the number key 75 with each set of records need not necessarily be provided. For example, the order of the records in the product database 9 may correspond to the number of the associated number key 75. Also in this case, it is possible to create the print medium 50 that is different for each of the number keys 75, similarly to the case shown in FIG. 2 in which the DB record number M is "1".

Further, after the print data is generated at step S37, step S42 or step S43 in FIG. 14, the texts to be printed may be displayed on the display 216 so that the user is notified of the texts to be printed.

Further, in the TP group mode, the print data is generated such that the print media 531 to 535 and the print media 541 to 543 (refer to FIG. 4) having different printed texts can be created in accordance with the number of times of operation of the number key 75. Further, also when the DB record number M is "3" in the database mode, the print data is generated such that the different print media 511 to 519 (refer to FIG. 3) can be created in accordance with the number of times of operation of the number key 75. In summary, the record to be used for printing is selected in accordance with the number of times of operation of the number key 751. However, the present disclosure is not limited to this example. For example, the record to be used for printing may be selected in accordance with a state in which the cursor key 71 is operated. In this case, for example, when the right key 713 is operated, the record number P may be incremented by one, in the same way at step S36 and step S41, and the record to be used for printing in the product database 95 or the fruit database 96 may be changed. Further, when the left key 714 is operated, the record number P may be decremented by one, differently from step S36 and step S41, and the record to be used for printing in the product database 95 or the fruit database 96 may be changed. In this case, user-friendliness is improved because the record to be used for printing can be changed in accordance with the operation state of the cursor key 71. In this manner, the input device 2 can provide a printing method that makes it possible to change the texts to be used for printing in accordance with the operation state of the cursor key 71.

Further, the user sets the database mode or the template mode by operating the function setting key 72 etc. included in the operation keys 7. Then, it is determined whether or not the template data is the template data 8 in which the arrangement positions and the fields are associated by the link information (step S55), and switching is performed between the case in which the print data is generated in the normal template mode (step S56 and step S42) and the case in which the print data is generated in the TP group mode (step S57 and step S43). However, the present disclosure is not limited to this example. For example, the user may be allowed to set the database mode, the normal template mode or the TP group mode by operating the function setting key 72 etc. included in the operation keys 7. In this case, without performing step S55, the CPU 201 may determine the normal template mode or the TP group mode based on the setting by the user. In this case, when the normal template mode is set, the print data may be generated using the default texts set in advance even when the template data 8 in which the arrangement positions and the fields are associated by the link information is used.

What is claimed is:

1. A printing device, comprising:

a processor;

a plurality of operation keys for receiving an operation from a user;

a printer configured to print texts on a print medium;

a plurality of data bases that includes a plurality of records associated with a plurality of template data;

the plurality of template data being respectively associated with the plurality of operation keys, the template data assigned to each of said plurality of operation keys being all different; and a memory configured to store said data bases having said plurality of records in which texts are respectively set for fields, the template data in which at least arrangement positions of the texts to be printed on the print medium are set, link information associating arrangement positions in the template data with the fields of the databases, template data that is linked with the database and template data that is not linked with the database existing together and computer-readable instructions that instruct the processor to execute steps comprising:

detecting operation of the operation keys by the user;

determining whether the template data corresponding to the operated operation key is the template data in which the arrangement positions and the fields of the data base is associated by the link information, when it is detected that one of the operation keys has been operated by the user;

selecting default texts that are set in advance in the template data that corresponds to the operated operation key when it is determined that the template data corresponding to the operated operation key is not the template data in which the arrangement positions and the fields are associated by the link information, and generating print data to print the selected default texts;

determining whether, when it is determined that the template data corresponding to the operated operation key is the template data in which the arrangement positions and the fields are associated by the link information, a template number has been changed, the template number being a number assigned to a template of template data;

setting, when it is determined that the template number has been changed, a record number in accordance with a state in which a selection key is operated, the record number being a variable to select texts to be arranged in the arrangement positions of the template data, the selection key being included among the operation keys and being used to select a record corresponding to the set record number to be used for printing from among the plurality of records of the database;

setting, when it is determined that the template number has not been changed, a record number corresponding to a record in accordance with a number of times of operation of the operation key;

generating the print data such that the texts that are respectively set for the fields of the record corresponding to the set record number are arranged in the arrangement positions that are associated with the fields by the link information, and causing the printer to print the generated print data on the print medium.

2. The printing device according to claim 1, wherein the link information associating the arrangement positions with the fields is included in the template data.

3. The printing device according to claim 1, further comprising:

a touch pad that is provided on a top surface of the printing device, and a sheet that is arranged on an upper side of the touch pad, such that the sheet is replaceable.

4. The printing device according to claim 3, wherein the touch pad that is set the operation keys.

5. The printing device according to claim 3, wherein the sheet, on which keys corresponding to the operation keys set on the touch pad are drawn, is arranged on a surface of the touch pad.

* * * * *